United States Patent
Ito et al.

(10) Patent No.: US 8,469,530 B2
(45) Date of Patent: Jun. 25, 2013

(54) ILLUMINATION APPARATUS, DISPLAY APPARATUS, AND METHOD OF PRODUCING AN ILLUMINATION APPARATUS

(75) Inventors: Yasushi Ito, Kanagawa (JP); Ryo Kasegawa, Chiba (JP); Naoji Nada, Kanagawa (JP)

(73) Assignee: Dexerials Corporation, Tokyo (JP)

( * ) Notice: Subject to any disclaimer, the term of this patent is extended or adjusted under 35 U.S.C. 154(b) by 343 days.

(21) Appl. No.: 12/734,901

(22) PCT Filed: Dec. 4, 2008

(86) PCT No.: PCT/JP2008/072082
§ 371 (c)(1),
(2), (4) Date: Jun. 1, 2010

(87) PCT Pub. No.: WO2009/072575
PCT Pub. Date: Jun. 11, 2009

(65) Prior Publication Data
US 2010/0246160 A1  Sep. 30, 2010

(30) Foreign Application Priority Data

Dec. 7, 2007 (JP) ................. 2007-317495
Apr. 24, 2008 (JP) ................. 2008-114393
Dec. 2, 2008 (JP) ................. 2008-307985

(51) Int. Cl.
*F21V 9/16* (2006.01)
*G02F 1/13357* (2006.01)
*C09K 11/70* (2006.01)

(52) U.S. Cl.
USPC ............ 362/84; 362/246; 362/293; 362/97.3

(58) Field of Classification Search
USPC ........................... 362/84, 246, 293
See application file for complete search history.

(56) References Cited

U.S. PATENT DOCUMENTS

| | | | |
|---|---|---|---|
| 2008/0054281 A1* | 3/2008 | Narendran et al. | 257/98 |
| 2008/0186732 A1* | 8/2008 | Awai et al. | 362/609 |

FOREIGN PATENT DOCUMENTS

| | | |
|---|---|---|
| JP | 10-274947 | 10/1998 |
| JP | 11-281795 | 10/1999 |
| JP | 2000-133006 A | 5/2000 |
| JP | 3118164 | 10/2000 |
| JP | 2001-142409 A | 5/2001 |
| JP | 2004-212503 A | 7/2004 |
| JP | 2005-108635 A | 4/2005 |
| JP | 2007-249220 A | 9/2007 |

* cited by examiner

*Primary Examiner* — Stephen F Husar
*Assistant Examiner* — James Cranson, Jr.
(74) *Attorney, Agent, or Firm* — Oliff & Berridge, PLC

(57) ABSTRACT

[Object] To provide an illumination apparatus capable of suppressing a chromaticity fluctuation due to a view angle and an incident angle.

[Solving Means] In an illumination apparatus for a display apparatus that includes a blue-color light-emitting diode (10) as a light source and a phosphor sheet (21) including a phosphor that obtains white light by converting a color of blue light from the blue-color light-emitting diode (10), diffusion plates (22, 23) are respectively provided opposed to a light-emitting-side surface and a light-incident-side surface of the phosphor sheet (21). The diffusion plate (22) opposed to the light-emitting-side surface of the phosphor sheet (21) suppresses a fluctuation of white-color chromaticity due to a view angle, and the diffusion plate (23) opposed to the light-incident-side surface of the phosphor sheet (21) suppresses a fluctuation of white-color chromaticity due to an incident angle.

24 Claims, 34 Drawing Sheets

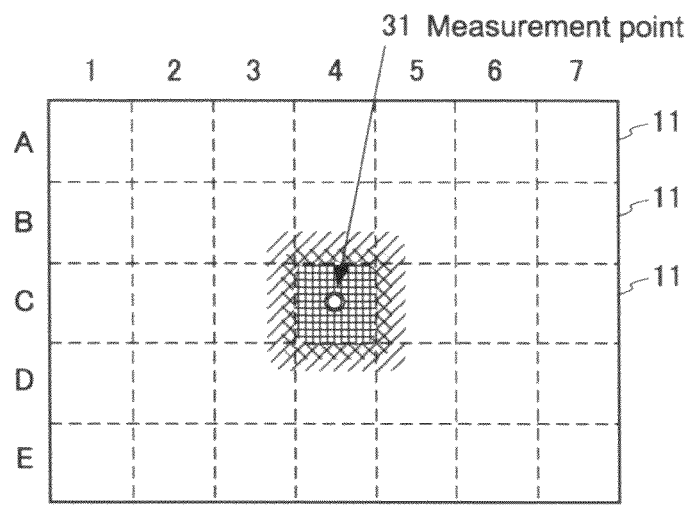
(A)
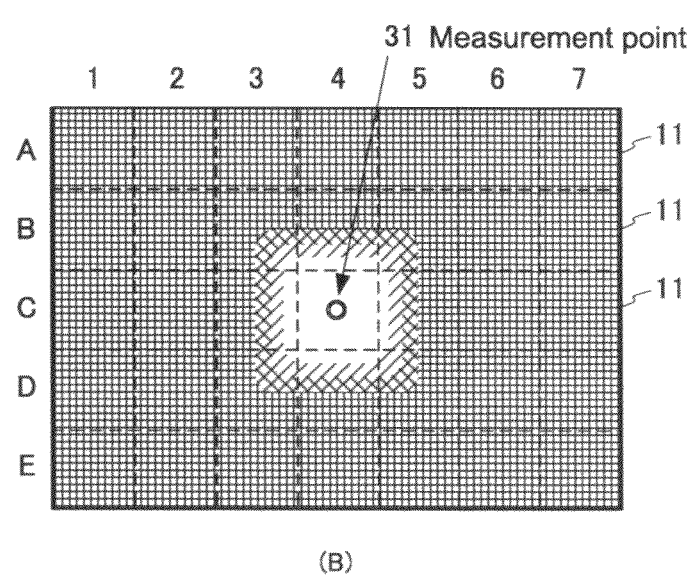
(B)
FIG.7

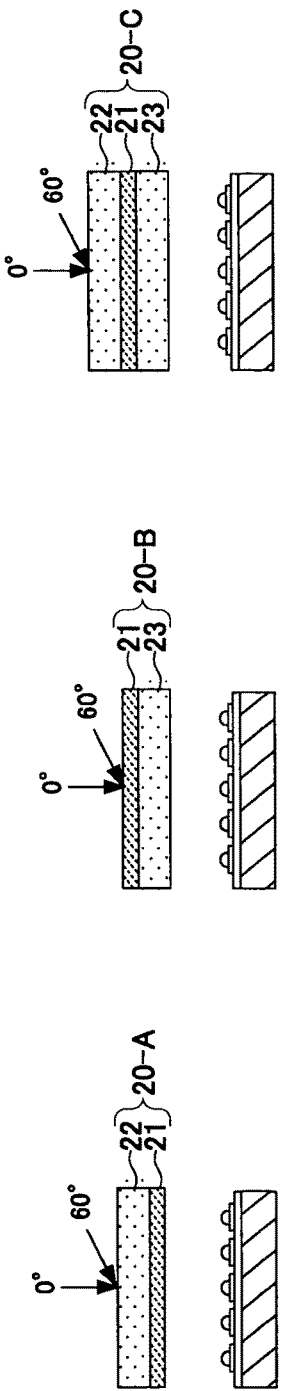
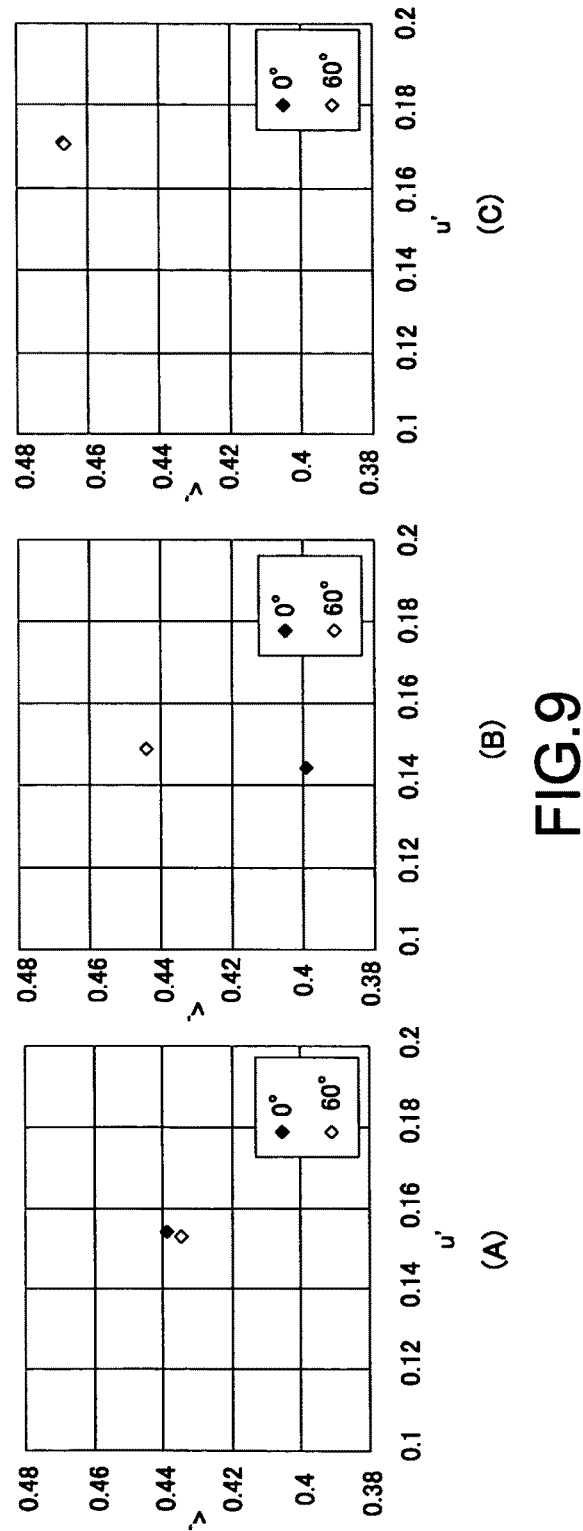
FIG.9

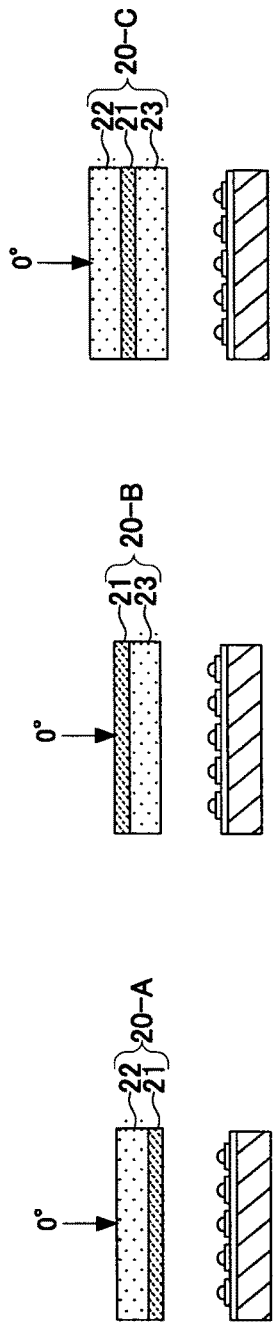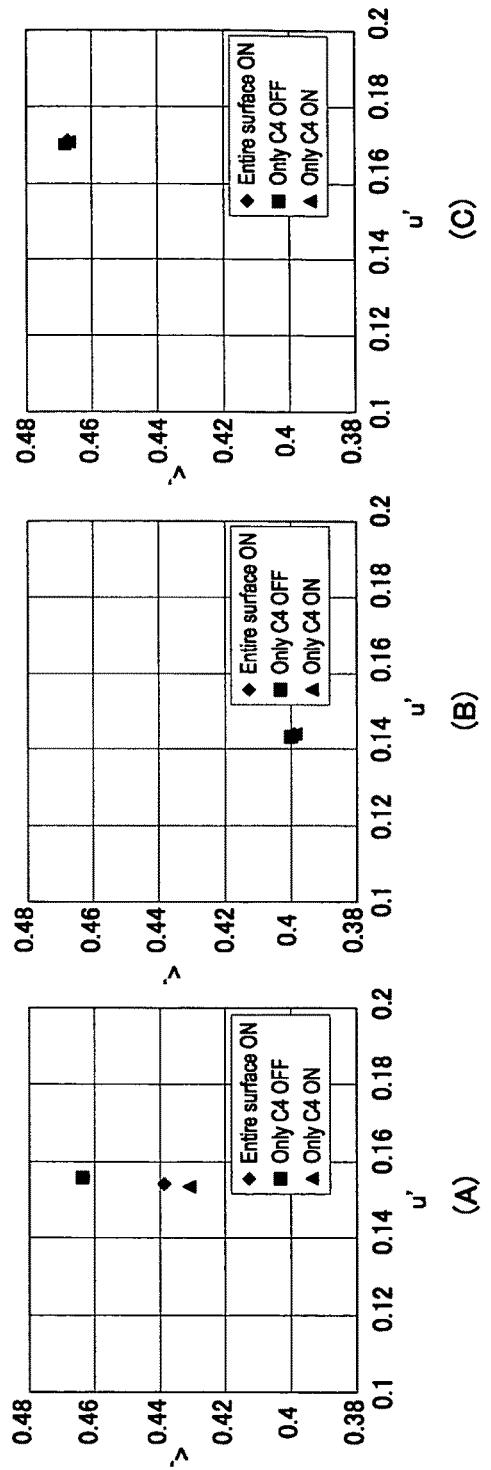
FIG.10

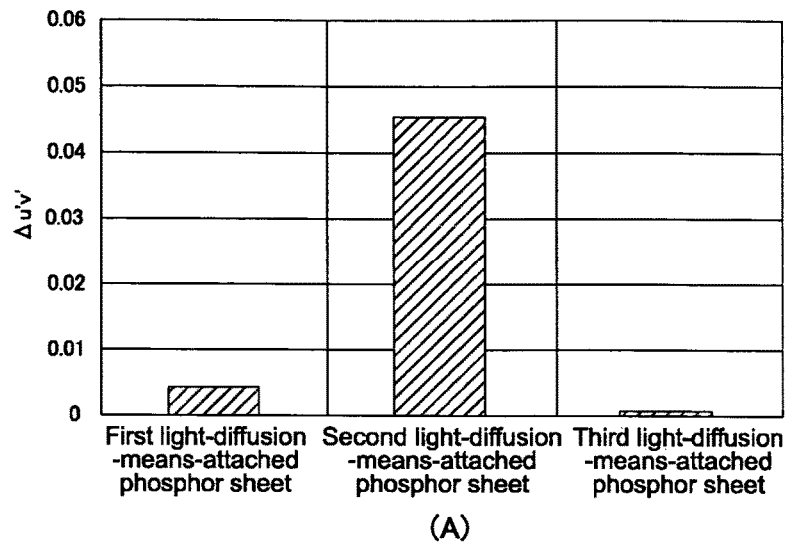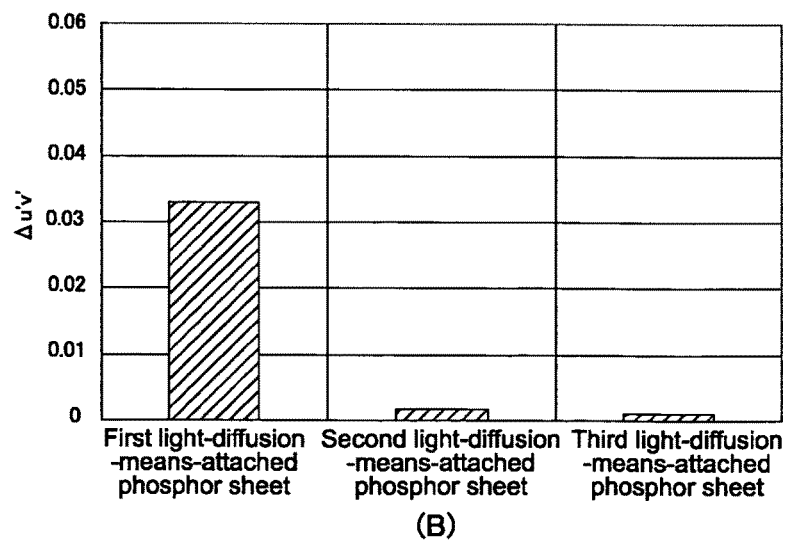
FIG.11

| | Sample configuration | | Incident angle | View angle |
|---|---|---|---|---|
| | Phosphor sheet on luminance meter side from diffusion plate | Phosphor sheet on light source side from diffusion plate | | |
| 1 | Present | Absent | 0° | 0° |
| 2 | | | 0° | 60° |
| 3 | | | 60° | 0° |
| 4 | Absent | Present | 0° | 0° |
| 5 | | | 0° | 60° |
| 6 | | | 60° | 0° |

FIG.25

|   | Thickness (mm) | Total diffused transmittance (%) |
|---|---|---|
| 1 | 2 | 86 |
| 2 | 3 | 79 |
| 3 | 5 | 66 |
| 4 | 2 | 56 |
| 5 | 3 | 49 |
| 6 | 5 | 40 |
| 7 | 2 | 37 |
| 8 | 3 | 28 |
| 9 | 5 | 20 |

FIG.28

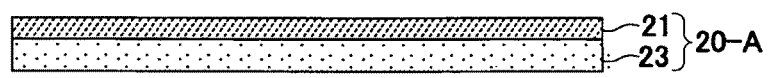
Sample 1
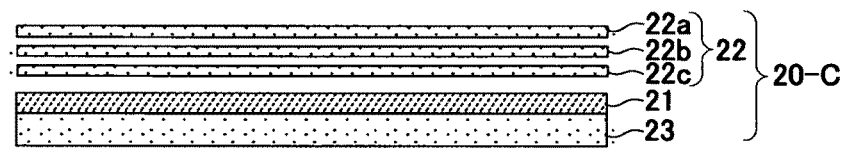
Sample 2
FIG.34

US 8,469,530 B2

ILLUMINATION APPARATUS, DISPLAY APPARATUS, AND METHOD OF PRODUCING AN ILLUMINATION APPARATUS

TECHNICAL FIELD

The present invention relates to an illumination apparatus used in a display apparatus such as a liquid crystal display, a display apparatus that uses the illumination apparatus, and a method of producing an illumination apparatus.

The present application contains subject matter related to that disclosed in Japanese Priority Patent Application JP 2007-317495 filed in the Japan Patent Office on Dec. 7, 2007, Japanese Priority Patent Application JP 2008-114393 filed in the Japan Patent Office on Apr. 24, 2008, and Japanese Priority Patent Application JP 2008-307985 filed in the Japan Patent Office on Dec. 2, 2008, the entire content of which is hereby incorporated by reference.

BACKGROUND ART

Liquid crystal displays are used as flat-screen display apparatuses. In the liquid crystal displays, a backlight that irradiates an entire surface of a liquid crystal panel from the back is used, and the liquid crystal displays can be roughly classified into a direct type and an edge-light type depending on structures of the backlights. Since light enters from a side surface of a light guide plate to be emitted uniformly from an upper surface of the light guide plate to the liquid crystal panel in the edge-light type, there has been a drawback that it becomes more difficult to illuminate the entire panel uniformly with high luminance as the display becomes larger. Therefore, a backlight of a current large-size display is provided with a plurality of fluorescent lamps to obtain desired characteristics (see, for example, Patent Document 1).

Incidentally, in recent years, aiming at additionally reducing a thickness and weight, prolonging a lifetime, and reducing an environmental load of backlights of large-size displays and also at improving moving-image characteristics by flash control, using a light-emitting diode as a light source is attracting attention. In a case of emitting white light to illuminate a liquid crystal panel in such a backlight that uses a light-emitting diode, the following two methods are used.

The first method is a method that uses light-emitting diodes of three colors of R, G, and B and involves combining light of the light-emitting diodes of three colors of R, G, and B by lighting them up at the same time to thus obtain white light. The second method is a method that uses a blue-color light-emitting diode chip 25 as a light-emitting device as shown in FIG. 20. This method involves covering a circumference of the blue-color light-emitting diode chip 25 with a phosphor-containing resin 42 to thus convert blue light from the blue-color light-emitting diode chip 25 into white light.

Moreover, it is also possible to adopt a structure in which a phosphor sheet 21 is provided between blue-color light-emitting diodes 10 and a liquid crystal panel (not shown) while being apart from the blue-color light-emitting diodes 10 as shown in FIG. 21, instead of covering the circumference of the blue-color light-emitting diode chip with the phosphor-containing resin.

Further, in recent years, there is proposed a method of controlling emission luminance of an entire backlight based on display luminance information of an entire display screen. Furthermore, there is also proposed a method of dividing a display screen into a plurality of areas (hereinafter, each area will be referred to as "segment") in association with light sources constituting a backlight and partially suppressing emission luminance of the light source in association with display luminance necessary for each of the segments (see, for example, Patent Document 2).

It should be noted that the "emission luminance" described above refers to luminance at a time light is emitted from the light sources, and the "display luminance" described above refers to luminance at a time light emitted from the light sources transmits through a display portion (display screen).

FIG. 22 conceptually show an example of such a control method. For example, in a case where an image 52 in which a brightest oval 51 is displayed at substantially a center portion and an area around the oval 51 is dark is displayed as shown in FIG. 22(A), assuming that a backlight of a liquid crystal display apparatus on which such an image 52 is displayed is divided longitudinally and laterally into a plurality of segments 11 as shown in FIG. 22(B), emission luminance of a segment corresponding to a spot having lowest display luminance is suppressed as shown in FIG. 22(C) when displaying the image 51 shown in FIG. 22(A). Here, 11-*a*, 11-*b*, and 11-*c* are segments whose emission luminance is not suppressed, and segments other than 11-*a*, 11-*b*, and 11-*c* are segments whose emission luminance is suppressed. By thus displaying an image while partially suppressing emission luminance of the backlight, it is possible to prevent the backlight from being lit wastefully, with the result that power consumption can be reduced.

Patent Document 1: Japanese Patent Application Laid-open No. 2005-108635
Patent Document 2: Japanese Patent Application Laid-open No. 2004-212503

DISCLOSURE OF THE INVENTION

Problem to be Solved by the Invention

Chromaticity at a position where the backlight is positioned is basically required to have a constant value at any angle or in any partial drive state. However, when a structure in which a phosphor sheet is separated from blue-color light-emitting diodes and brought close to a liquid crystal panel is adopted as shown in FIG. 21, there has been a problem that white-color chromaticity may fluctuate depending on a view angle or due to the number or positions of segments that are driven when partially suppressing emission luminance of the light sources. The principle is as follows.

FIG. 23 are diagrams showing states of light that enters the phosphor sheet 21 and light that exits the phosphor sheet 21, FIG. 23(A) showing a certain position on a light-emitting-side surface of the backlight from a direction vertical to that surface, FIG. 23(B) showing the position from an oblique direction. Blue light from the blue-color light-emitting diodes is partially color-converted by the phosphor of the phosphor sheet 21 after entering the phosphor sheet 21. The color-converted light and the blue light that has passed through without being converted are both output to the light-emitting side of the phosphor sheet 21. Since an optical path length L inside the phosphor sheet 21 becomes longer and a ratio of excitation light to be converted increases as an incident angle of the blue light emitted from the blue-color light-emitting diodes with respect to the phosphor sheet 21 increases, output light becomes yellowish when a yellow-color phosphor is used as the phosphor, for example.

The present invention has been made in view of the above points, and it is therefore an object of the invention to provide an illumination apparatus capable of suppressing a chromaticity fluctuation due to a view angle and an incident angle, a display apparatus that uses the illumination apparatus, and a method of producing an illumination apparatus.

Means for Solving the Problem

For attaining the above object, according to the present invention, there is provided an illumination apparatus including: a light source; a phosphor portion constituted of a phosphor that obtains white light from light from the light source; and a light diffusion means provided in correspondence with a surface of the phosphor portion.

In the present invention, since the light diffusion means is provided in correspondence with the surface of the phosphor portion, a chromaticity fluctuation due to a view angle and an incident angle can be suppressed.

The light diffusion means may be provided to face a light-incident surface of the phosphor portion. With this structure, a chromaticity fluctuation due to an incident angle can be suppressed.

The light diffusion means may be provided to face a light-emitting surface of the phosphor portion. With this structure, a chromaticity fluctuation due to a view angle can be suppressed.

Furthermore, the light diffusion means may include a first light diffusion means provided to face a light-incident surface of the phosphor portion and a second light diffusion means provided to face a light-emitting surface of the phosphor portion. With this structure, a chromaticity fluctuation due to a view angle and an incident angle can be suppressed.

The first light diffusion means and the second light diffusion means are respectively provided in close contact with the light-incident surface and the light-emitting surface of the phosphor portion. With this structure, thinning of the illumination apparatus becomes possible.

When thinning of an illumination apparatus is not required, the first light diffusion means and the second light diffusion means may be respectively provided apart from the light-incident surface and the light-emitting surface of the phosphor portion.

The light source is constituted of a plurality of light source devices that are arranged two-dimensionally, and emission luminance of the plurality of light source devices can be controlled individually for each of a plurality of areas into which the surface of the phosphor portion is divided. According to the present invention, a chromaticity fluctuation due to a partial drive pattern can be suppressed in a case where such control is possible.

The light source may be a blue-color light-emitting diode, and the phosphor portion may include a phosphor that emits yellow light by being excited by blue light as excitation light. With this structure, a white-color chromaticity fluctuation due to a view angle and an incident angle can be suppressed in the illumination apparatus that emits white light.

According to another aspect of the present invention, there is provided a display apparatus including a display panel and an illumination apparatus provided adjacent to the display panel, the illumination apparatus including a light source, a phosphor portion constituted of a phosphor that obtains white light from light from the light source, and a light diffusion means provided in correspondence with a surface of the phosphor portion.

Since the illumination apparatus that includes the light diffusion means is used in the present invention, a chromaticity fluctuation on the display panel surface due to a view angle and an incident angle can be suppressed.

According to another aspect of the present invention, there is provided a method of producing an illumination apparatus, including: mixing and stirring particles of a phosphor material, particles of a light diffusion material, and a medium material and injecting the mixture into a mold; separately forming a first layer that contains the phosphor material as a main component and a second layer that contains the light diffusion material as a main component using a difference in a sedimentation velocity in the medium material that is due to a difference in a specific gravity between the phosphor material and the light diffusion material; and solidifying the medium material.

According to the present invention, as well as a light-diffusion-means-attached phosphor sheet of a two-layer structure that is constituted of a light diffusion layer and a phosphor layer, a light-diffusion-means-attached phosphor sheet of a three-layer structure in which light diffusion layers are provided on both sides of a phosphor layer can be produced efficiently. Moreover, since an integrated light-diffusion-means-attached phosphor sheet of a two-layer structure can be obtained, an assembling task of the light-diffusion-means-attached phosphor sheet in a later process becomes easier, with the result that a productivity can be improved.

EFFECT OF THE INVENTION

As described above, according to the present invention, an illumination apparatus that suppresses a chromaticity fluctuation due to a view angle and an incident angle can be obtained, and by using the illumination apparatus in a display apparatus, a display apparatus with excellent display quality can be obtained.

BEST MODES FOR CARRYING OUT THE INVENTION

Hereinafter, embodiments of the present invention will be described with reference to the drawings. In the following embodiments, a display apparatus including an illumination apparatus of the present invention is applied to a liquid crystal television.

It should be noted that an applicable range of the display apparatus of the present invention is not limited to the liquid crystal television, and the display apparatus is widely applicable to, for example, a personal computer and a PDA (Personal Digital Assistant) as long as it includes the illumination apparatus.

FIG. 18 is a schematic perspective view of a liquid crystal television 100 as the display apparatus of the present invention, and FIG. 19 is an exploded perspective view schematically showing a portion held by a casing 300 of the liquid crystal television 100. As shown in the figures, the liquid crystal television 100 includes a liquid crystal panel 200 as a display panel, an illumination apparatus 1 (101, 201, 301, and 401), a drive circuit 420 that drives the liquid crystal panel 200, the casing 300 that holds the liquid crystal panel, the illumination apparatus 1, and the drive circuit 420, and a stand 400 that holds the casing 300. The illumination apparatus 1 illuminates an image display area of the liquid crystal panel 200 from the back and emits white light.

Hereinafter, an illumination apparatus as an embodiment of the present invention will be described.

(First Embodiment)

FIG. 1(A) is a schematic plan view of a light-emitting device substrate 14 partially constituting the illumination apparatus 1, and FIG. 1(B) is a schematic cross-sectional diagram of the illumination apparatus 1. FIG. 2 are partially-enlarged cross-sectional diagrams of the illumination apparatus 1.

As shown in FIG. 1, the illumination apparatus 1 includes the light-emitting device substrate 14 whose planar shape is a rectangle, reflective plates 13, and a light-diffusion-means-attached phosphor sheet 20 whose planar shape is a rectangle. The light-emitting device substrate 14 and the light-diffusion-means-attached phosphor sheet 20 are apart by about 20 mm, and a gap therebetween is supported by a plurality of support columns 12 and the reflective plates 13. The reflective plates 13 are provided so as to surround the space defined by the light-emitting device substrate 14 and the phosphor sheet 20 from four sides. By providing the reflective plates 13, excitation light from light-emitting diodes 10 as a light source is reflected by the reflective plates 13 even when guided to an end portion of the illumination apparatus 1, with the result that the light can be reused and a favorable light efficiency can be obtained. A side of the illumination apparatus 1 on which the phosphor sheet 20 is provided becomes a light-emitting surface, and the illumination apparatus 1 is disposed such that the liquid crystal panel 200 to be a display screen is disposed on the light-emitting surface side of the illumination apparatus 1 in the state of the liquid crystal television 100 shown in FIG. 19. The illumination apparatus 1 of this embodiment is used in a large-size liquid crystal television of, for example, 46 inches, and has a dimension of 1020 mm×570 mm.

The light-emitting device substrate 14 is constituted of a substrate 15 formed of metal, an insulation layer 16 provided on one surface of the substrate 15, and a plurality of blue-color light-emitting diodes 10 provided on one surface of the insulation layer 16. As the blue-color light-emitting diode 10, an InGaN-based blue-color light-emitting diode is used, for example.

In the light-emitting device substrate 14, a total of 875 blue-color light-emitting diodes 10 (35×25) are arranged two-dimensionally at regular intervals of, for example, a 12-mm pitch on an entire surface of the light-diffusion-means-attached phosphor sheet 20. Moreover, the blue-color light-emitting diodes 10 are sectioned into blocks called "segments" each having a total of 25 (5×5) diodes as a unit for which emission luminance is to be controlled, the control including switch-on/off of the blue-color light-emitting diodes 10.

FIG. 14 is a cross-sectional diagram specifically showing a package of the blue-color light-emitting diode 10. As shown in the figure, to one surface of the insulation layer 16, a sub-mount substrate 26 on the surface of which a chip 25 of the blue-color light-emitting diode 10 is mounted is bonded by a thermally-conductive adhesive 27. An electrode portion (not shown) provided on the sub-mount substrate 26 is electrically connected to an electrode portion 17 on the substrate 15 side by bonding wires 18. The chip 25 of the blue-color light-emitting diode 10 as well as an area in the vicinity thereof extending to a portion connected by the bonding wires 18 is sealed by a transparent resin compact 28 as a lens body. As the sealing resin material, a material having excellent light resistance or heat resistance, such as silicone is used.

The shape of the lens body is not limited to a hemisphere shown in FIG. 14 and may instead be a bombshell shape as shown in FIG. 15. Moreover, instead of sealing the chip 25 of the blue-color light-emitting diode 10 with the resin compact 28, it is also possible to provide a lens body 29 supported by a lens holder 19 at a position apart from the chip 25 of the blue-color light-emitting diode 10 in an optical-axis direction.

FIGS. 2(A), 2(B), and 2(C) are cross-sectional diagrams of the illumination apparatus 1, specifically showing the light-diffusion-means-attached phosphor sheet 20. As shown in the figures, the light-diffusion-means-attached phosphor sheet 20 is constituted of a phosphor sheet 21 as a phosphor portion and diffusion plates 22 and 23 as a light diffusion means provided opposed to at least one surface of the phosphor sheet 21 (light-incident-side surface, light-emitting-side surface, or both of those surfaces). Specifically, the light-diffusion-means-attached phosphor sheet 20 in the illumination apparatus 1 shown in FIG. 2(A) is constituted of the phosphor sheet 21 and the diffusion plate 22 opposed to the light-incident-side surface of the phosphor sheet 21. The light-diffusion-means-attached phosphor sheet 20 in the illumination apparatus 1 shown in FIG. 2(B) is constituted of the phosphor sheet 21 and the diffusion plate 23 opposed to the light-emitting-side surface of the phosphor sheet 21. The light-diffusion-means-attached phosphor sheet 20 in the illumination apparatus 1 shown in FIG. 2(C) is constituted of the Phosphor sheet 21 and the diffusion plates 22 and 23 respectively provided opposed to the light-incident-side surface and the light-emitting-side surface of the phosphor sheet 21.

The phosphor sheet 21 includes, on a transparent plastic film, two types of phosphors including a green-color phosphor that emits green light having a green-color wavelength by being excited by blue light having a blue-color wavelength, that is emitted from the blue-color light-emitting diodes 10, and a red-color phosphor that emits red light having a red-color wavelength by being excited by the blue light. With this structure, green light and red light color-converted by the phosphor sheet 21 are mixed with blue light as the excitation light emitted from the blue-color light-emitting diodes 10, with the result that white light is generated and emitted. Moreover, as the phosphor sheet 21, a sheet that includes, on a transparent plastic film, a yellow-color phosphor that emits yellow light having a yellow-color wavelength by being excited by the blue light having the blue-color wavelength, that is emitted from the blue-color light-emitting diodes 10, may be used. In this case, yellow light color-converted by the phosphor sheet 21 is mixed with blue light, with the result that white light is obtained.

Further, although the blue-color light-emitting diodes have been used as the excitation light source in this embodiment, the present invention is not limited thereto. For example, it is also possible to use purple-color (near-ultraviolet) light-emitting diodes instead of the blue-color light-emitting diodes and use, as the phosphor layer, a layer including a red-color phosphor that emits red light having a red-color wavelength by being excited by purple (near-ultraviolet) light having a purple-color (near-ultraviolet) wavelength, that is emitted from the purple-color (near-ultraviolet) light-emitting diodes, a green-color phosphor that emits green light having a green-color wavelength by being excited by the purple (near-ultraviolet) light, and a blue-color phosphor that emits blue light having a blue-color wavelength by being excited by the purple (near-ultraviolet) light. With this structure, red light, green light, and blue light color-converted by the phosphor layer are mixed with the purple (near-ultraviolet) light, with the result that white light is obtained.

Examples of the material of the yellow-color phosphor include $(Y, Gd)_3(Al, Ga)_5O_{12}:Ce^{3+}$ (commonly known as YAG:$Ce^{3+}$), $\alpha$-SiAlON:$Eu^{2+}$, and $(Ca, Sr, Ba)_3SiO_4:Eu^{2+}$. Examples of the material of the green-color phosphor include $(Ca, Sr, Ba)_3SiO_4:Eu^{2+}$, $SrGa_2S_4:Eu^{2+}$, $\beta$-SiAlON:$Eu^{2+}$, and $Ca_3Sc_2Si_3O_{12}:Ce^{3+}$. Examples of the material of the red-color phosphor include $(Ca, Sr, Ba)S:Eu^{2+}$, $(Ca, Sr, Ba)_2SiO_5N_8:Eu^{2+}$, and $CaAlSiN_3:Eu^{2+}$.

Next, an operation of the light-diffusion-means-attached phosphor sheet 20 in the illumination apparatus 1 of this embodiment will be described.

First, for explaining an operation of the light diffusion means provided in the phosphor sheet 21, a view angle dependency in a case where the diffusion plate 22 is provided opposed to only the light-emitting-side surface of the phosphor sheet 21 and a case where the diffusion plate 23 is provided opposed to only the light-incident-side surface of the phosphor sheet 21 will be described.

FIG. 3 are diagrams showing a view angle dependency in the case where the diffusion plate 22 is provided opposed to only the light-emitting-side surface of the phosphor sheet 21, FIG. 3(A) showing a certain position of the light-emitting surface of the phosphor sheet 21 from the front, that is, in a direction vertical to the light-emitting surface, FIG. 3(B) showing the certain position of the light-emitting surface of the phosphor sheet 21 in an oblique direction. When the diffusion plate 22 is thus provided opposed to only the light-emitting-side surface of the phosphor sheet 21, light that has passed through the phosphor sheet 21 at various angles is averaged by the subsequent diffusion plate 22 by scattering. Thus, a white-color chromaticity fluctuation due to a view angle is suppressed.

FIG. 4 are diagrams showing a view angle dependency in the case where the diffusion plate 23 is provided opposed to only the light-incident-side surface of the phosphor sheet 21, FIG. 4(A) showing a certain position of the light-emitting surface of the phosphor sheet 21 from the front, that is, in a direction vertical to the light-emitting surface, FIG. 4(B) showing the certain position of the light-emitting surface of the phosphor sheet 21 in an oblique direction. Although an effect of suppressing the view angle dependency of white-color chromaticity of emission light cannot be expected by the diffusion plate 23 provided opposed to the light-incident-side surface of the phosphor sheet 21, an effect of suppressing a white-color chromaticity fluctuation due to an incident angle can be obtained as will be described later.

Next, an incident angle dependency of white-color chromaticity in the case where the diffusion plate 22 is provided opposed to only the light-emitting-side surface of the phosphor sheet 21 and the case where the diffusion plate 23 is provided opposed to only the light-incident-side surface of the phosphor sheet 21 will be described.

FIG. 5 are diagrams showing an incident angle dependency in the case where the diffusion plate 22 is provided opposed to only the light-emitting-side surface of the phosphor sheet 21, FIG. 5(A) showing a case where blue light from the blue-color light-emitting diodes 10 enters the phosphor sheet 21 in a direction vertical to the light-incident surface, FIG. 5(B) showing a case where blue light from the blue-color light-emitting diodes 10 enters the phosphor sheet 21 in a direction oblique to the light-incident surface. In the case of FIG. 5(A), since most of the light that has passed through the phosphor sheet 21 becomes white light, emission light from the diffusion plate 22 also becomes white light. In the case of FIG. 5(B), since most of the light that has passed though the phosphor sheet 21 becomes yellowish white light, emission light from the subsequent diffusion plate 22 becomes yellowish white light even when the diffusion plate 22 averages the light by scattering. Therefore, with this structure, an effect of suppressing a white-color chromaticity fluctuation due to an incident angle cannot be expected, though there is an effect of suppressing a white-color chromaticity fluctuation due to a view angle as described above.

FIG. 6 are diagrams showing an incident angle dependency in the case where the diffusion plate 23 is provided opposed to only the light-incident-side surface of the phosphor sheet 21, FIG. 6(A) showing a case where blue light from the blue-color light-emitting diodes 10 enters the phosphor sheet 21 in a direction vertical to the light-incident surface, FIG. 6(B) showing a case where blue light from the blue-color light-emitting diodes 10 enters the phosphor sheet 21 in a direction oblique to the light-incident surface. With this structure, by the diffusion plate 22 averaging the light that has entered at various angles by scattering, a difference in the white-color chromaticity between the cases of FIGS. 5(A) and 5(B) can be made small. In other words, an effect of suppressing a white-color chromaticity fluctuation due to an incident angle can be obtained.

Summing up the above facts, the following can be found.
1. When the, diffusion plate 22 is provided opposed to only the light-emitting-side surface of the phosphor sheet 21, a white-color chromaticity fluctuation due to a view angle can be suppressed, provided that an effect of suppressing a white-color chromaticity fluctuation due to an incident angle cannot be expected.
2. When the diffusion plate 23 is provided opposed to only the light-incident-side surface of the phosphor sheet 21, a white-color chromaticity fluctuation due to an incident angle can be suppressed, provided that an effect of suppressing a white-color chromaticity fluctuation due to a view angle cannot be expected.

Therefore, when the diffusion plates 22 and 23 are respectively provided opposed to the light-emitting-side surface and the light-incident-side surface of the phosphor sheet 21, both the view angle dependency and the incident angle dependency can be suppressed.

Incidentally, the incident angle dependency is synonymous with a partial drive pattern dependency in a case where the blue-color light-emitting diodes 10 are partially driven in a segment unit. FIG. 7 are diagrams showing examples of partial drive patterns. As described above, in the illumination apparatus 1 of this embodiment, a total of 875 (35×25) blue-color light-emitting diodes 10 are arranged two-dimensionally, and emission luminance control including switch-on/off of the blue-color light-emitting diodes 10 can be performed for each unit of the segments 11 respectively corresponding to a plurality of areas into which the surface of the phosphor portion, that is, a display screen of the liquid crystal panel 200 is divided. In this embodiment, a block including a total of 25 blue-color light-emitting diodes 10 (5×5) is handled as one segment 11. Here, rows of the segments 11 are assigned with alphabetical letters A to E, whereas columns of the segments 11 are assigned with numerals 1 to 7.

FIG. 7(A) shows a partial drive pattern at a time only the segment 11 in Column 4 on Row C is turned off, and FIG. 7(B) shows a partial drive pattern at a time only the segment 11 in Column 4 on Row C is turned on. When a white-color chromaticity measurement point 31 is set at a center of the segment 11 in Column 4 on Row C, a time of the partial drive pattern in which the segment 11 in Column 4 on Row C is turned off corresponds to a time blue light enters the light-incident surface of the phosphor sheet 21 in only the oblique direction, and a time of the partial drive pattern in which only the segment 11 in Column 4 on Row C is turned on corresponds to a time blue light enters the light-incident surface of the phosphor sheet 21 in only the vertical direction. In other words, by providing the diffusion plate 23 so that it opposes only the light-incident-side surface of the phosphor sheet 21, the partial drive pattern dependency of white-color chromaticity can be suppressed.

Next, results of measuring, by an experiment, the view angle dependency and the partial drive pattern dependency in the case where the diffusion plate 22 is provided opposed to only the light-emitting-side surface of the phosphor sheet 21, the case where the diffusion plate 23 is provided opposed to only the light-incident-side surface of the phosphor sheet 21, and the case where the diffusion plates 22 and 23 are respectively provided opposed to the light-emitting-side surface and the light-incident-side surface of the phosphor sheet 21 will be described.

It should be noted that in this experiment, a sheet obtained by applying, onto a transparent plastic film (Teijin DuPont Films) having a thickness of 100 um, an ink in which a blue-color excitation phosphor (Kasei Optonix, Ltd, YAG: Ce=cerium addition yttrium aluminum garnet) is mixed with a cellulose-based binder by screen printing in a film thickness of about 15 um was used as the phosphor sheet 21. Moreover, as the light diffusion means, an acrylic opal diffusion plate (Sumitomo Chemical Co., Ltd) having a thickness of 2 mm was used. FIG. 8 shows spectral diffusion reflection and spectral diffusion transmission characteristics of a single diffusion plate used in the experiment.

For the light-diffusion-means-attached phosphor sheet 20, three types of sheets including a diffusion-means-attached phosphor sheet in which the diffusion plate 22 is provided opposed to only the light-emitting-side surface of the phosphor sheet 21 (hereinafter, referred to as "first light-diffusion-means-attached phosphor sheet 20-A"), a diffusion-means-attached phosphor sheet in which the diffusion plate 23 is provided opposed to only the light-incident-side surface of the phosphor sheet 21 (hereinafter, referred to as "second light-diffusion-means-attached phosphor sheet 20-B"), and a diffusion-means-attached phosphor sheet in which the diffusion plates 22 and 23 are respectively provided opposed to the light-emitting-side surface and the light-incident-side surface of the phosphor sheet 21 (hereinafter, referred to as "third light-diffusion-means-attached phosphor sheet 20-C") were prepared.

A blue-color light-emitting diode having a dominant emission wavelength of 470 nm, that is available from STANLEY ELECTRIC CO., LTD, was used as the light-emitting device to be used as the light source, and a total of 875 blue-color light-emitting diodes (35×25) were arranged two-dimensionally at regular intervals of a 12-mm pitch. In addition, a block including a total of 25 blue-color light-emitting diodes (5×5) was handled as a segment as a unit of emission luminance control including switch-on/off of the blue-color light-emitting diodes 10. A gap between the blue-color light-emitting diodes 10 and the light-diffusion-means-attached phosphor sheet 20 was set to be 20 mm. It should be noted that a white-color diffuse reflection sheet was laid at portions where the blue-color light-emitting diodes 10 are not provided, on the surface of the light-emitting device substrate 14 on a side on which the blue-color light-emitting diodes 10 are mounted.

Next, a measurement method will be described. Using a spectral radiance meter (Konica Minolta Holdings, Inc., product name CS-1000A), luminance, chromaticity, and an emission spectrum at a measurement point on the screen were measured. The measurement point was set to be a center of the screen in FIG. 7, that is, a center of the segment in Column 4 on Row C. Two view angles of 0° and 60° with an angle orthogonal to the screen as 0° were used in the measurement. Three partial drive patterns in which the entire screen is on, only the segment in Column 4 on Row C is off, and only the segment in Column 4 on Row C is on were used in the measurement.

Next, measurement results will be described. FIG. 9 are graphs each showing measurement results of the view angle dependency. Here, only the measurement results in the pattern in which the entire screen is on are shown. FIG. 9(A) shows measurement results in a case where the first light-diffusion-means-attached phosphor sheet 20-A is used, FIG. 9(B) shows measurement results in a case where the second light-diffusion-means-attached phosphor sheet 20-B is used, and FIG. 9(C) shows measurement results in a case where the third light-diffusion-means-attached phosphor sheet 20-C is used. As can be seen from the measurement results, it was confirmed that a white-color chromaticity fluctuation due to a view angle is small in the case where the first light-diffusion-means-attached phosphor sheet 20-A in which the diffusion plate 22 is provided opposed to only the light-emitting-side surface of the phosphor sheet 21 is used and the case where the third light-diffusion-means-attached phosphor sheet 20-C in which the diffusion plates 22 and 23 are respectively provided opposed to the light-emitting-side surface and the light-incident-side surface of the phosphor sheet 21 is used.

FIG. 10 are graphs each showing measurement results of the partial drive pattern dependency. Here, only the measurement results in the case where the view angle during the measurement is 0° are shown. FIG. 10(A) shows measurement results in a case where the first light-diffusion-means-attached phosphor sheet 20-A is used, FIG. 10(B) shows measurement results in a case where the second light-diffusion-means-attached phosphor sheet 20-B is used, and FIG. 10(C) shows measurement results in a case where the third light-diffusion-means-attached phosphor sheet 20-C is used. The measurement results showed that a chromaticity fluctuation is small and an excellent effect of suppressing the partial drive pattern dependency is obtained in the case where the second light-diffusion-means-attached phosphor sheet 20-B in which the diffusion plate 23 is provided opposed to only the light-incident-side surface of the phosphor sheet 21 is used and the case where the third light-diffusion-means-attached phosphor sheet 20-C in which the diffusion plates 22 and 23 are respectively provided opposed to the light-emitting-side surface and the light-incident-side surface of the phosphor sheet 21 is used.

The measurement results above are shown in FIGS. 11(A) and 11(B). Here, FIG. 11(A) is a graph obtained by compiling the measurement results of the view angle dependency, and FIG. 11(B) is a graph obtained by compiling the measurement results of the partial drive pattern dependency. The ordinate axis in each graph represents a product of a value of u' and a value of v'. It can be seen from FIGS. 11(A) and 11(B) that an exceptional structure in which both the view angle dependency and the partial drive pattern dependency are low is obtained when the third light-diffusion-means-attached phosphor sheet 20-C in which the diffusion plates 22 and 23 are respectively provided opposed to the light-emitting-side surface and the light-incident-side surface of the phosphor sheet 21 is used. Still, in a case of use in a state where the entire surface is constantly on instead of the partial drive, for example, not only the structure that uses the third light-diffusion-means-attached phosphor sheet 20-C but also a structure that uses the light-diffusion-means-attached phosphor sheet 20-B in which the diffusion plate 23 is provided opposed to only the light-incident-side surface of the phosphor sheet 21 is useful. Moreover, when always used in front view, not only the structure that uses the third light-diffusion-means-attached phosphor sheet 20-C but also a structure that uses the first light-diffusion-means-attached phosphor sheet 20-A in which the diffusion plate 22 is provided opposed to only the light-emitting-side surface of the phosphor sheet 21 is useful.

Next, a modified example of this embodiment will be described.

Although a diffusion plate has been used as the light diffusion means in the above embodiment, it is also possible to use a film having the same light diffusion function in place of the diffusion plate. Moreover, instead of an opal diffusion plate, a diffusion plate that is imparted with a diffusion property owing to minute asperities 32 formed on a surface of a transparent plate-like or film-like member as shown in FIG. 12 (Modified Example 1) may be used as the light diffusion means. Further, a structure in which the phosphor sheet and the light diffusion means are integrated in a thickness direction (Modified Example 2) may be adopted. Furthermore, the phosphor sheet and the light diffusion means do not always need to be in close contact with each other, and a gap portion 33 may be provided as shown in FIG. 13 (Modified Example 3). Also in the case where the modified examples above are adopted, the same effect as the above embodiment can be obtained.

(Second Embodiment)

FIG. 17 is a cross-sectional diagram showing a structure of a side-emission-type backlight to which the present invention is applied. A side-emission-type backlight 2 includes a light guide plate 41, a light-emitting diode 10 for irradiating emission light from one end surface of the light guide plate 41, and the light-diffusion-means-attached phosphor sheet 20 provided opposed to a light-emitting surface 41a of the light guide plate 41. Although a sheet in which the diffusion plate 22 as the light diffusion means is provided opposed to only the light-emitting-side surface of the phosphor sheet 21 is exemplified as the light-diffusion-means-attached phosphor sheet 20 in this example, a sheet in which the diffusion plate 23 is provided opposed to only the light-incident-side surface of the phosphor sheet 21 or a sheet in which the diffusion plates 22 and 23 are respectively provided opposed to the light-emitting-side surface and the light-incident-side surface of the phosphor sheet 21 may be adopted instead. The light guide plate 41 includes a scattering means 42 and a reflection means 43 on a surface on the other side of the light-emitting surface 41a opposed to the phosphor sheet 20.

In the side-emission-type backlight 2, emission light from the light-emitting diode 10 enters the light guide plate 41 from one end surface. The light guided to the light guide plate 41 proceeds while repeating a total reflection inside the light guide plate 41, and components that have become smaller than a total reflection angle by the scattering means 42 are emitted from the light-emitting surface 41a of the light guide plate 41 opposed to the phosphor sheet 20.

Also in such a side-emission-type backlight 2, a view angle dependency and incident angle dependency of white-color chromaticity can be suppressed by using the light-diffusion-means-attached phosphor sheet 20.

Next, results obtained by variably measuring a diffusion level (total diffused transmittance) of the diffusion means of the light-diffusion-means-attached phosphor sheet 20 will be described.

FIG. 24 shows a measurement environment. In this measurement environment, for quantizing a light source incident angle, light obtained by collimating light from the light-emitting diode 10 by a collimator lens 61 is irradiated onto one surface of the light-diffusion-means-attached phosphor sheet 20, and a measurement point on the other surface is measured with a spectral radiance meter 62. Light propagates from the blue-color light-emitting diode 10 to the collimator lens 61 via a collective lens 63 and an optical fiber 64. FIG. 25 is a list of measurement conditions. As shown in the table, measurements were performed for all combinations of a measurement surface (diffusion plate side or phosphor sheet side), an incident angle (0° or) 60°, and a view angle (0° or 60°).

FIG. 26 are graphs obtained by compiling results of measuring a view angle dependency of white-color chromaticity in the measurement environment described above using a diffusion plate having a thickness of 2 mm and a total diffused transmittance of 37%. FIG. 26(A) shows measurement results in a case where the phosphor sheet 22 side is used as the measurement surface, and FIG. 26(B) shows measurement results in a case where the diffusion plate 23 side is used as the measurement surface. As can be seen from the measurement results, it was confirmed that a white-color chromaticity fluctuation due to a view angle can be made small when the diffusion plate having a thickness of 2 mm and a total diffused transmittance of 37% is provided on either the light-emitting side or the light-incident side of the phosphor sheet 21.

FIG. 27 are graphs obtained by compiling results of measuring the chromaticity fluctuation Δu'v' in an incident angle range of 0° to 60° and the chromaticity fluctuation Δu'v' in a view angle range of 0° to 60° using 9 types of diffusion plates having different thicknesses and total diffused transmittances as shown in FIG. 28. FIG. 27(A) shows measurement results in a case where the phosphor sheet 22 side is used as the measurement surface, and FIG. 27(B) shows measurement results in a case where the diffusion plate 23 side is used as the measurement surface. As can be seen from the graphs, a chromaticity difference sharply increases around a point where the total diffused transmittance exceeds 60%. Thus, it was found that it is favorable to use a diffusion plate having a total diffused transmittance smaller than about 60%.

(Third Embodiment)

Next, a method of producing an illumination apparatus 1 of this embodiment will be described.

As shown in FIG. 2, the illumination apparatus 1 of this embodiment includes the light-diffusion-means-attached phosphor sheet 20. The light-diffusion-means-attached phosphor sheet 20 is constituted of the phosphor sheet 21 as the phosphor portion and the diffusion plates 22 and 23 as the light diffusion means provided opposed to at least one surface (light-incident-side surface, light-emitting-side surface, or both of those surfaces) of the phosphor sheet 21. For efficiently producing such a light-diffusion-means-attached phosphor sheet 20, the following method can be adopted.

First, materials will be described.

As the phosphor material, particles of a phosphor such as an inorganic phosphor are used, for example. As described above, a yellow-color phosphor, a green-color phosphor, a red-color phosphor, and the like are selected based on a wavelength of excitation light. The phosphor materials for those colors are also the same as those described above. An appropriate diameter of the particles of a phosphor is, for example, about several um to several-ten um, but may be changed in relation with a size and thickness of a phosphor layer and various other conditions.

As the light diffusion material, particles of an inorganic material or an organic material are used. Examples of the inorganic material include oxide silicon, calcium carbonate, titanic oxide, and aluminum oxide. Examples of the organic material include polymethylmethacrylate, polystyrene, and polysiloxane (silicone). In either case, a material in which an absorption of visible light is small is to be used. Moreover, since a light diffusion effect becomes larger as a refractive index difference between the light diffusion material and a medium material enveloping it increases, the materials are to be selected while taking this into account. A diameter of the particles of the light diffusion material is to be set to be about 1 to 50 um from a viewpoint of obtaining an appropriate light diffusion, but may be changed in relation with various other conditions. It is considered appropriate to set a concentration of the particles of the light diffusion material with respect to all the materials in the light diffusion layer to be 0.1 to 10 wt % in view of a balance between the light diffusion and light loss, but this may also be changed in relation with a quality of a material, a material, and various other conditions.

As the medium material, glass is used, or a resin material is used in view of ease in production, for example. Examples of the resin material include a polycarbonate resin, a polyester resin such as polyethylene terephthalate, polybutylene terephthalate, and poly(ethylene-2,6-naphthalate), a polyethylene resin, a propylene-ethylene copolymer, a polystyrene resin, and a resin having an alicyclic structure in which a copolymer of a styrene-based monomer and methacrylic acid has a hydrogenated double bond (including aromatic ring). Of those, a polycarbonate resin, a polyester resin, a copolymer of an aromatic vinyl monomer and alkyl (metha)acrylate ester having a lower alkyl group, a (metha)acrylic resin, and a resin having an alicyclic structure are favorable. It should be noted that there are many types of other resin materials that are appropriate for the medium material. Moreover, the medium material may be any of a thermoplastic material, a heat-curable material, and a light-curable material.

Next, a method of producing a light-diffusion-means-attached phosphor sheet 20 will be described.

(First Production Method)

First, a phosphor sheet and a light diffusion plate are produced by different processes. The phosphor sheet is obtained by, for example, mixing and stirring a phosphor material and a medium material, injecting the mixture into a mold, and curing the medium material by heating or light irradiation. Subsequently, the phosphor sheet and the light diffusion plate are bonded to each other by a thermal compression or adhesion. Here, by bonding the light diffusion plate to one surface of the phosphor sheet, a light-diffusion-means-attached phosphor sheet 20 of a two-layer structure shown in FIGS. 2(A) and 2(B) that is constituted of a light diffusion layer and a phosphor layer can be obtained. Moreover, by bonding the light diffusion plates to both surfaces of the phosphor sheet, a light-diffusion-means-attached phosphor sheet 20 of a three-layer structure shown in FIG. 2(C) in which the light diffusion layers are provided on both sides of the phosphor layer can be obtained. It should be noted that the phosphor sheet and the light diffusion plate do not always need to be bonded by a thermal compression or adhesion and only need to be placed on top of each other and fixed by a frame or the like while circumferences or parts thereof are held.

(Second Production Method)

FIG. 29 is a process flow of a second production method for the light-diffusion-means-attached phosphor sheet 20. Particles of a phosphor material, particles of a light diffusion material, and a medium material are mixed and stirred (ST01) and injected into a mold (ST02). After that, a layer that contains the phosphor material as a main component and a layer that contains the light diffusion material as a main component are formed separately using a difference in a sedimentation velocity among the materials in the medium material that is due to a difference in a specific gravity between the phosphor material and the light diffusion material (ST03). Processes up to this point are carried out at high temperature when a thermoplastic resin is used as the medium material and carried out at room temperature when a heat-curable or light-curable resin is used as the medium material.

By adopting a light diffusion material having the same specific gravity as the resin that is used as the medium material and adopting a material having a larger specific gravity than the resin as the phosphor material, it is possible to favorably cause the layer separation in the medium material. For example, by adopting a resin and a light diffusion material having a specific gravity of about 1 to 1.5 and adopting a phosphor material having a specific gravity of about 4 to 5, such as YAG:Ce$^{3+}$, most of the phosphor material sediments at a lower portion of the mold, with the result that a layer containing the phosphor material as a main component is formed at the lower portion of the mold. On the other hand, since the light diffusion material hardly moves in the medium material and most of the phosphor material sediments at the lower portion of the mold, a layer containing the phosphor material as a main component is formed at an upper portion of the mold. Although, eventually, the light diffusion material remains at the lower portion of the mold and the phosphor material slightly remains at the upper portion of the mold, an optical influence due to those residuals is negligible.

It should be noted that the relationship among the specific gravities of the phosphor material, the light diffusion material, and the medium material is not limited to that described above. For example, even when a difference between the specific gravity of the medium material and the light diffusion material and the specific gravity of the phosphor material is smaller or larger than that of the above example, a favorable layer separation can be realized by adjusting a time the materials are left abandoned for the separation. Moreover, a material having a smaller specific gravity than the medium material may be adopted as the light diffusion material.

Referring back to the description on the process flow, the medium material is subsequently solidified by heating when a heat-curable resin is used as the medium material or solidified by light irradiation when a light-curable resin is used as the medium material (ST04) and taken out of the mold (ST05). As a result, a light-diffusion-means-attached phosphor sheet 20 of a two-layer structure that is constituted of a light diffusion layer and a phosphor layer is obtained.

(Modified Example 1 of Second Production Method)

The above descriptions have been given on the method of producing a light-diffusion-means-attached phosphor sheet 20 of a two-layer structure that is constituted of a light diffusion layer and a phosphor layer. Next, a method of producing a light-diffusion-means-attached phosphor sheet of a three-layer structure in which light diffusion layers are provided on both sides of a phosphor layer will be described.

FIG. 30 is a diagram showing a method of producing a light-diffusion-means-attached phosphor sheet 20' of a three-layer structure.

First, in FIG. 30, a light-diffusion-means-attached phosphor sheet 20 of a two-layer structure that is constituted of a light diffusion layer 22 and the phosphor layer 21 is produced by the second production method that uses the difference in specific gravity among the materials, and an additionally-produced light diffusion plate 23 is bonded to an exposure-surface side of the phosphor layer 21 by a thermal compression or adhesion. As a result, a light-diffusion-means-attached phosphor sheet 20' of a three-layer structure is obtained. It should be noted that the light-diffusion-means-attached phosphor sheet 20 of a two-layer structure and the light diffusion plate 23 do not always need to be bonded by a thermal compression or adhesion and only need to be placed on top of each other and fixed by a frame or the like while circumferences or parts thereof are held.

(Modified Example 2 of Second Production Method)

FIG. 31 is a diagram showing Modified Example 2 of the method of producing a light-diffusion-means-attached phosphor sheet 20' of a three-layer structure.

First, two light-diffusion-means-attached phosphor sheets 20 each of a two-layer structure and constituted of the light diffusion layer 22 and the phosphor layer 21 are produced by the second production Method that uses the difference in specific gravity among the materials, and exposure surfaces of the phosphor layers 21 of the two light-diffusion-means-attached phosphor sheets 20 each of a two-layer structure are bonded to each other by a thermal compression or adhesion. As a result, a light-diffusion-means-attached phosphor sheet 20' of a three-layer structure is obtained. It should be noted that the exposure surfaces of the phosphor layers 21 of the two light-diffusion-means-attached phosphor sheets 20 each of a two-layer structure do not always need to be bonded by a thermal compression or adhesion and only need to be placed on top of each other and fixed by a frame or the like while circumferences or parts thereof are held.

EXAMPLE

Next, an example of the second production method will be described.

YAG:Ce (average grain size of 5 um) available from Kasei Optonix, Ltd was adopted as the phosphor material. The concentration of the phosphor material with respect to all the materials in the phosphor layer was set to be 5 wt %. Titanium dioxide (average grain size of 1 um or less) available from Kojundo Chemical Laboratory Co., Ltd was adopted as the light diffusion material. The concentration of the light diffusion material with respect to all the materials in the light diffusion layer was set to be 3 wt %. A heat-curable resin (product name: Lumiplus LP-1100) available from MITSUBISHI GAS CHEMICAL COMPANY, INC. was adopted as the medium material.

After mixing the phosphor material, the light diffusion material, and the medium material described above, stir-defoaming was performed using a vacuum-pump-attached stirrer. Next, the mixed materials subjected to the stir-defoaming were injected into a glass dish as a mold having a depth of 2 mm, heated for 1 hour up to 80° from room temperature, and slowly cooled down to room temperature after being left abandoned for 3 hours at 80°. By thus separating the phosphor material and the light diffusion material in the medium material, a layer containing the phosphor material as a main component and a layer containing the light diffusion material as a main component were formed separately. Finally, the resultant was taken out of the glass dish so that a light-diffusion-means-attached phosphor sheet of a two-layer structure that is constituted of the light diffusion layer and the phosphor layer was obtained.

By the second production method, a light-diffusion-means-attached phosphor sheet of a three-layer structure in which the light diffusion layers are provided on both sides of the phosphor layer as well as the light-diffusion-means-attached phosphor sheet of a two-layer structure that is constituted of the light diffusion layer and the phosphor layer can be produced efficiently. Moreover, since an integrated light-diffusion-means-attached phosphor sheet of a two-layer structure can be obtained, an assembling task of the light-diffusion-means-attached phosphor sheet in a later process becomes easier, with the result that a productivity can be improved.

(Regarding Diffused Transmittance of Light Diffusion Means)

Next, a relationship among a diffused transmittance of the light diffusion means, a view angle dependency and incident angle dependency (partial drive pattern dependency) of white-color chromaticity, and luminance will be described.

FIG. 32 are graphs obtained by adding the measurement results (C) of the chromaticity fluctuation in the third light-diffusion-means-attached phosphor sheet 20-C to the measurement results (A) and (B) of the chromaticity fluctuation in the first light-diffusion-means-attached phosphor sheet 20-A and the second light-diffusion-means-attached phosphor sheet 20-B shown in FIG. 27. In the third light-diffusion-means-attached phosphor sheet 20-C in which the diffusion plates 22 and 23 are respectively provided opposed to the light-emitting-side surface and the light-incident-side surface of the phosphor sheet 21, both the white-color chromaticity fluctuations due to a view angle and an incident angle are suppressed. In all the cases of FIGS. 32(A), 32(B), and 32(C), the chromaticity fluctuation $\Delta u'v'$ within the view angle range of 0° to 60° and the chromaticity fluctuation $\Delta u'v'$ within the incident angle range of 0° to 60° increase sharply from around a point where the total diffused transmittance exceeds 60%. Moreover, the chromaticity fluctuation $\Delta u'v'$ within the view angle range of 0° to 60° concentrates around 0 when the total diffused transmittance of the diffusion plate 22 provided on the light-emitting-side surface of the phosphor sheet 21 falls below about 60%. On the other hand, the chromaticity fluctuation $\Delta u'v'$ within the incident angle range of 0° to 60° also concentrates around 0 when the total diffused transmittance of the diffusion plate 23 provided on the light-incident-side surface of the phosphor sheet 21 falls below about 60%. Based on those facts, it is optimal to use diffusion plates having a smaller total diffused transmittance than about 60% as the diffusion plates 22 and 23 for suppressing the chromaticity fluctuations due to a view angle and an incident angle.

Further, since an increase of the chromaticity fluctuation $\Delta u'v'$ is exponential from around a point where the total diffused transmittance slightly exceeds 60%, an effect of suppressing the chromaticity fluctuations due to a view angle and an incident angle can be obtained even when the total diffused transmittance exceeds 60% to a certain degree. Specifically, in the graphs shown in FIG. 32, targeting the diffusion plate having a thickness of 5 mm and a total diffused transmittance of 66% (FIG. 28), the chromaticity fluctuation $\Delta u'v'$ within the view angle range of 0° to 60° (71 in FIG. 32(A)) is smaller than a minimum chromaticity fluctuation $\Delta u'v'$ within the view angle range of 0° to 60° in the structure in which the diffusion plate is not provided opposed to the light-emitting-side surface of the phosphor sheet 21 (FIG. 32(B)). Similarly, the chromaticity fluctuation $\Delta u'v'$ within the incident angle range of 0° to 60° targeting the diffusion plate (FIG. 28) (72 in FIG. 32(B)) is smaller than the minimum chromaticity fluctuation $\Delta u'v'$ within the view angle range of 0° to 60° in the structure in which the diffusion plate is not provided opposed to the light-incident-side surface of the phosphor sheet 21 (FIG. 32(A)). Based on those facts, up to 66% is effective as an upper limit of the total diffused transmittance of the diffusion plates 22 and 23.

Next, a lower limit of the total diffused transmittance of the diffusion plates 22 and 23 will be discussed.

The lower limit of the total diffused transmittance of the diffusion plates 22 and 23 is restricted in relation to luminance. Although the upper limit of the total diffused transmittance of the diffusion plates is determined based on the suppression of the chromaticity fluctuation due to a view angle and an incident angle, if the total diffused transmittance of the diffusion plate 23 provided opposed to the light-incident-side surface of the phosphor sheet 21 is lowered too much, luminance decreases. On the other hand, luminance does not change even when the total diffused transmittance of the diffusion plate 22 provided opposed to the light-emitting-side surface of the phosphor sheet 21 is changed.

FIG. 33 is a graph showing measurement results of backlight luminance obtained by changing the total diffused transmittance of the diffusion plate 23 provided opposed to the light-incident-side surface of the phosphor sheet 21. Samples 1 and 2 shown in FIG. 34 were used as measurement targets. Sample 1 is the first light-diffusion-means-attached phosphor sheet 20-A in which the diffusion plate 23 is provided opposed to only the light-incident-side surface of the phosphor sheet 21. Sample 2 is the third light-diffusion-means-attached phosphor sheet 20-C in which a plurality of diffusion films 22a, 22b, and 22c placed on top of one another are opposed to the light-emitting-side surface of the phosphor sheet 21 of the first light-diffusion-means-attached phosphor sheet 20-A. Here, a plate-like diffusion plate 23 having a thickness of 0.5 mm or more was used as each of Samples 1 and 2, an a film-like diffusion film having a thickness of 0.5 mm or less was used as each of the diffusion films 22a, 22b, and 22c. For the diffusion films 22a, 22b, and 22c, respectively, BS-712 (KEIWA, Inc.), RBEF (3M), and RBEF-400 (3M) were used from the phosphor sheet 21 side.

As shown in the graph of FIG. 33, in both the measurement results of Samples 1 and 2, a prominent decrease of luminance appeared from around a point where the total diffused transmittance of the diffusion plate 23 provided opposed to the light-incident-side surface of the phosphor sheet 21 falls below 50%. Based on this fact, it is desirable for the total diffused transmittance of the diffusion plate 23 provided opposed to the light-incident-side surface of the phosphor sheet 21 to be 50% or more.

Based on the above facts, it is desirable for the total diffused transmittance of the diffusion plate 22 provided on the light-emitting-side surface of the phosphor sheet 21 to be 66% or less. Particularly when the total diffused transmittance falls below 60%, the chromaticity fluctuation due to a view angle can be sufficiently suppressed. A lower limit of the total diffused transmittance of the diffusion plate 22 provided on the light-emitting-side surface of the phosphor sheet 21 is not particularly limited. On the other hand, it is also desirable for the total diffused transmittance of the diffusion plate 23 provided on the light-incident-side surface of the phosphor sheet 21 to be 66% or less. Particularly when the total diffused transmittance falls below 60%, the chromaticity fluctuation due to an incident angle can be sufficiently suppressed. In addition, it is desirable for the total diffused transmittance of the diffusion plate 23 provided on the light-incident-side surface of the phosphor sheet 21 to be 50% or more for suppressing a decrease of the luminance.

The present invention is not limited to the above embodiments, and various updates can of course be added without departing from the gist of the present invention.

BRIEF DESCRIPTION OF DRAWINGS

[FIG. 7] Diagrams showing examples of partial drive patterns.

[FIG. 9] Graphs each showing measurement results of the view angle dependency.

[FIG. 10] Graphs each showing measurement results of a partial drive pattern dependency.

[FIG. 11] Graphs obtained by compiling the measurement results of the view angle dependency of FIG. 9 and the measurement results of the partial drive pattern dependency of FIG. 10, respectively.

[FIG. 25] A diagram showing a list of measurement conditions used in the measurement of FIG. 24.

[FIG. 28] A diagram showing a list of thicknesses and total diffused transmittances of the light diffusion plates used in the measurement of FIG. 27.

[FIG. 34] A diagram showing samples of a first light-diffusion-means-attached phosphor sheet used in the luminance measurement.

Figure 1:
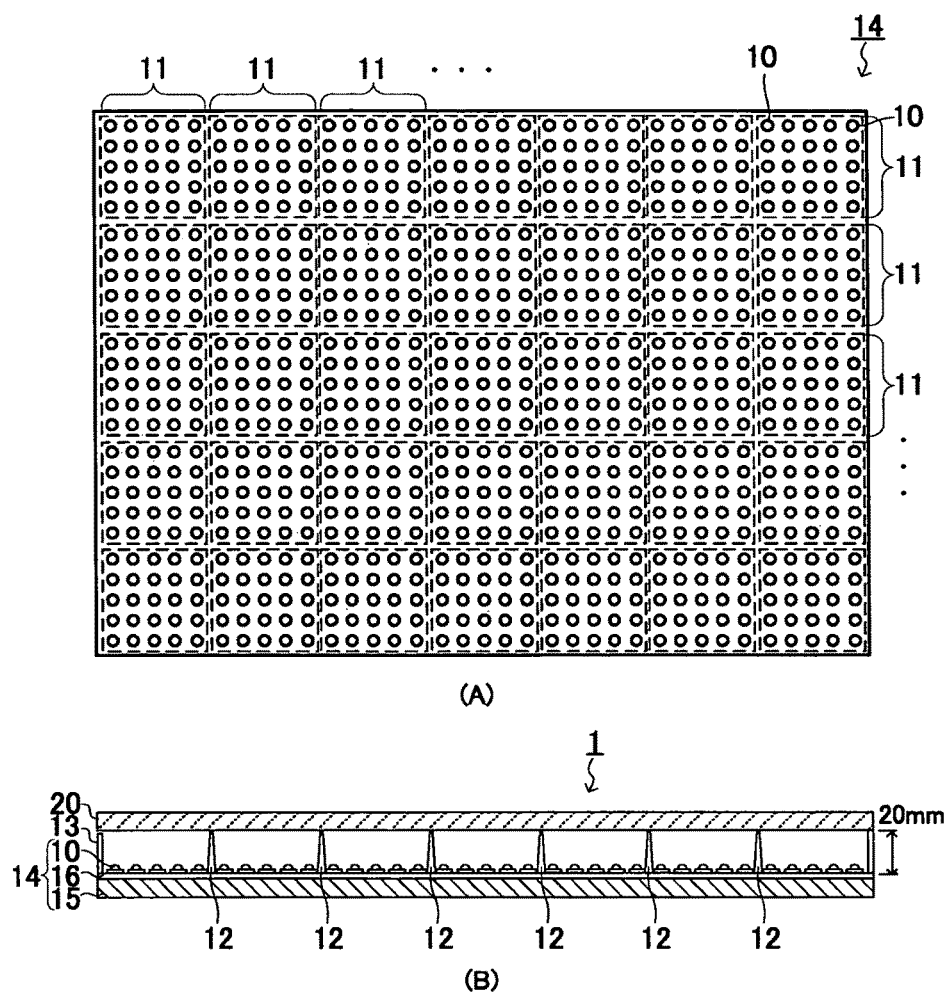
[FIG. 1] A schematic plan view of a light-emitting device substrate partially constituting an illumination apparatus according to a first embodiment of the present invention and a schematic cross-sectional diagram of the illumination apparatus.
Figure 2:
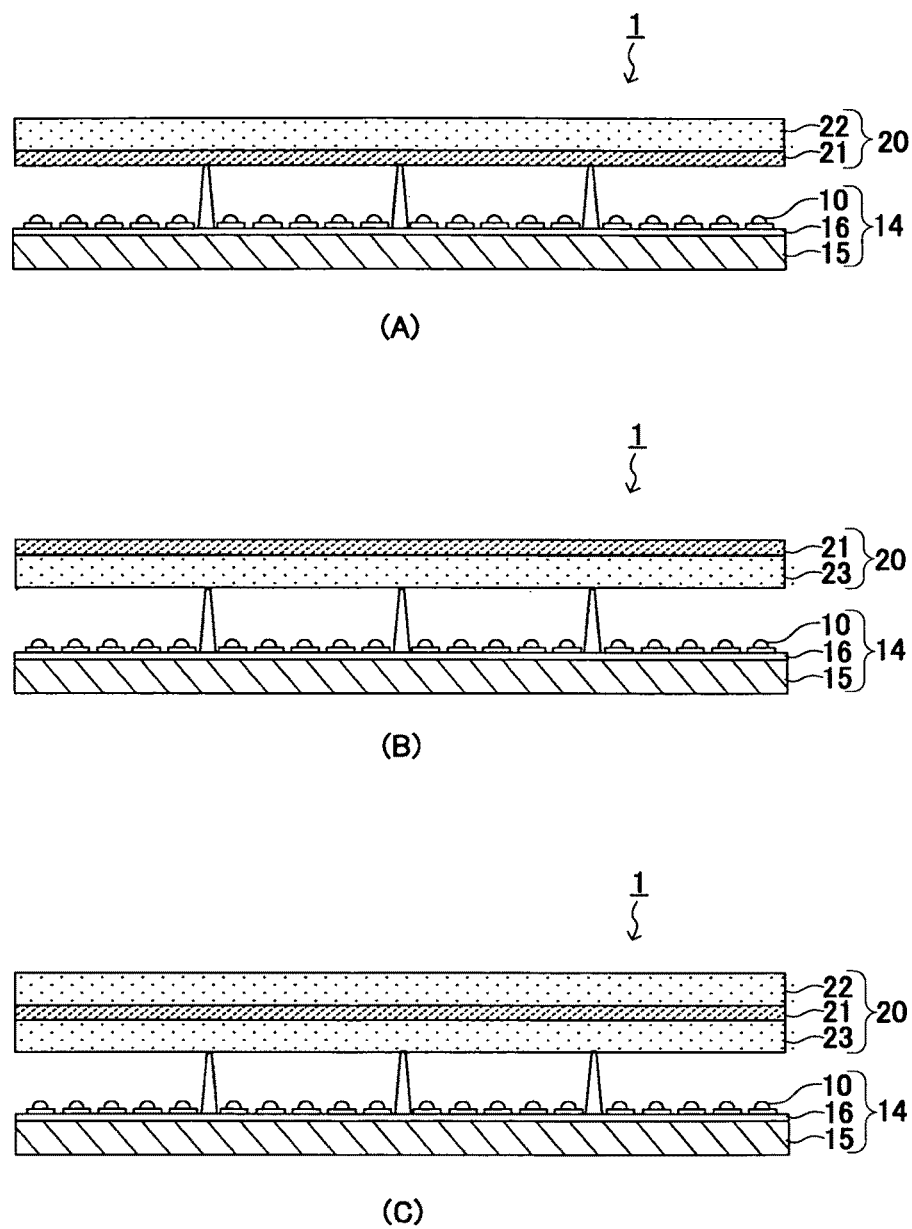
[FIG. 2] Partially-enlarged cross-sectional diagrams of the illumination apparatus shown in FIG. 1.
Figure 3:
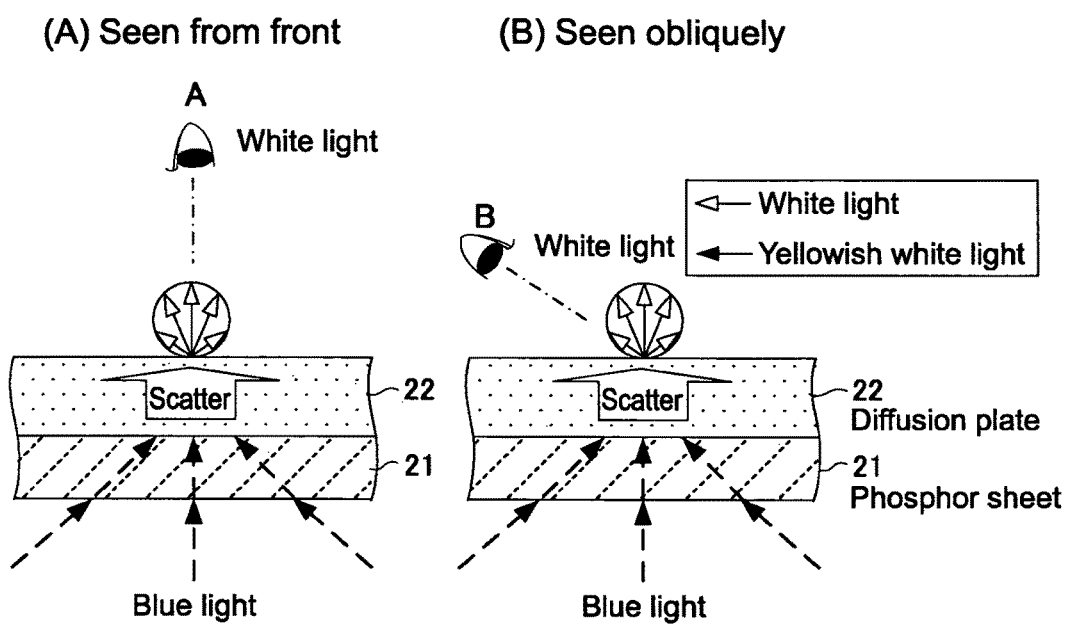
[FIG. 3] Diagrams showing a view angle dependency in a case where a diffusion plate as a diffusion means is provided only on a light-emitting-side surface of a phosphor sheet.
Figure 4:
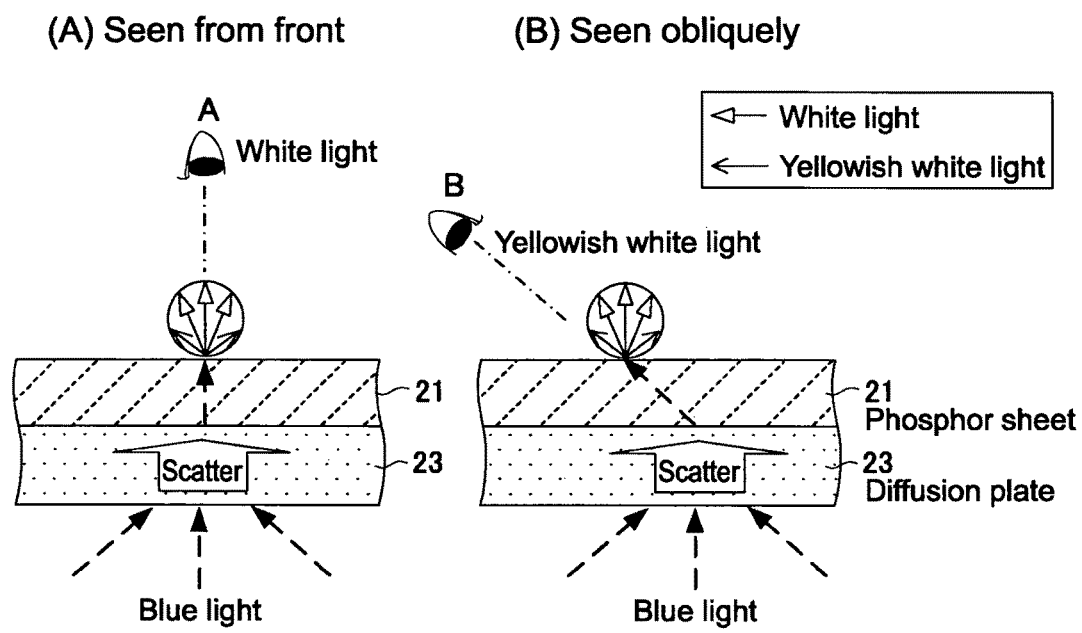
[FIG. 4] Diagrams showing a view angle dependency in a case where the diffusion plate as the diffusion means is provided only on a light-incident-side surface of the phosphor sheet.
Figure 5:
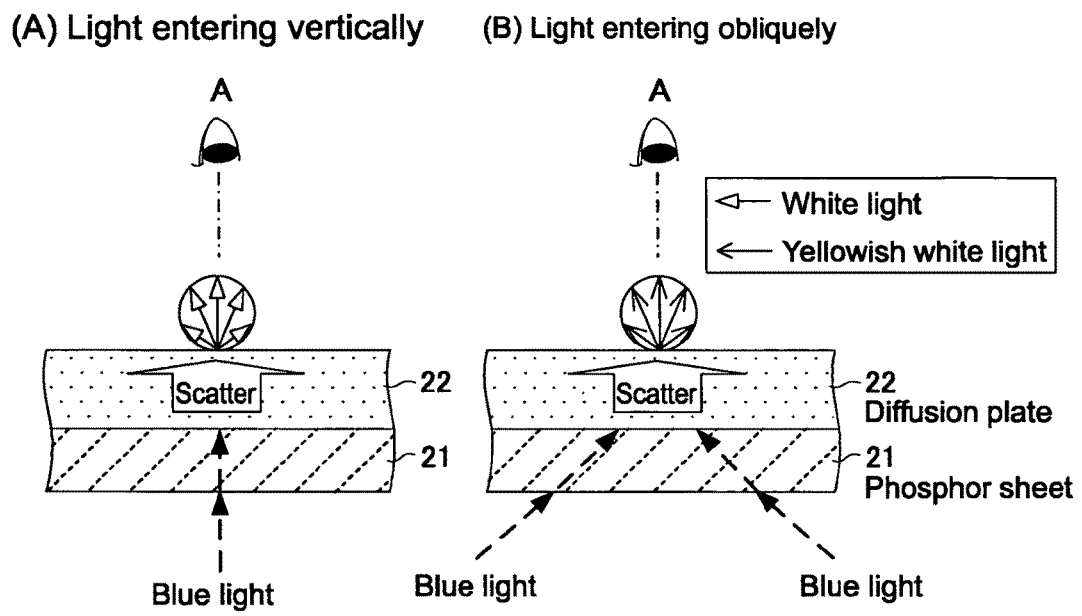
[FIG. 5] Diagrams showing an incident angle dependency in a case where the diffusion plate as the diffusion means is provided only on the light-emitting-side surface of the phosphor sheet.
Figure 6:
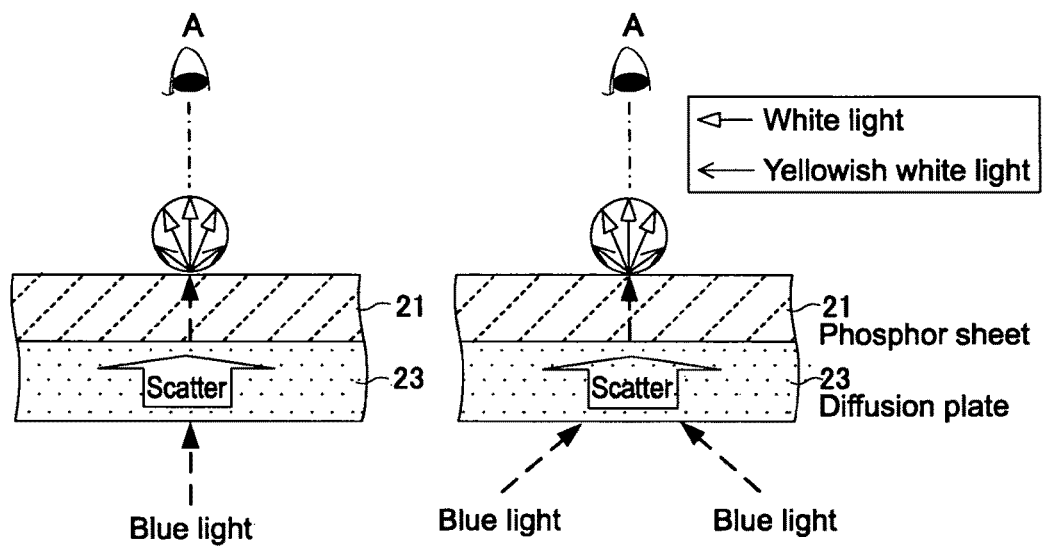
[FIG. 6] Diagrams showing an incident angle dependency in a case where the diffusion plate as the diffusion means is provided only on the light-incident-side surface of the phosphor sheet.
Figure 8:
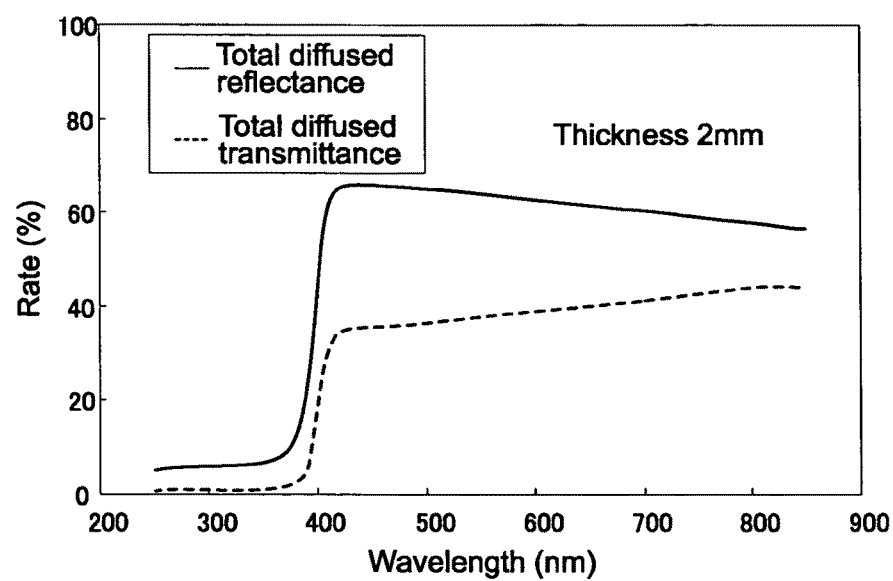
[FIG. 8] A graph showing spectral diffusion reflection and spectral diffusion transmission characteristics of a single diffusion plate used in an experiment.
Figure 12:
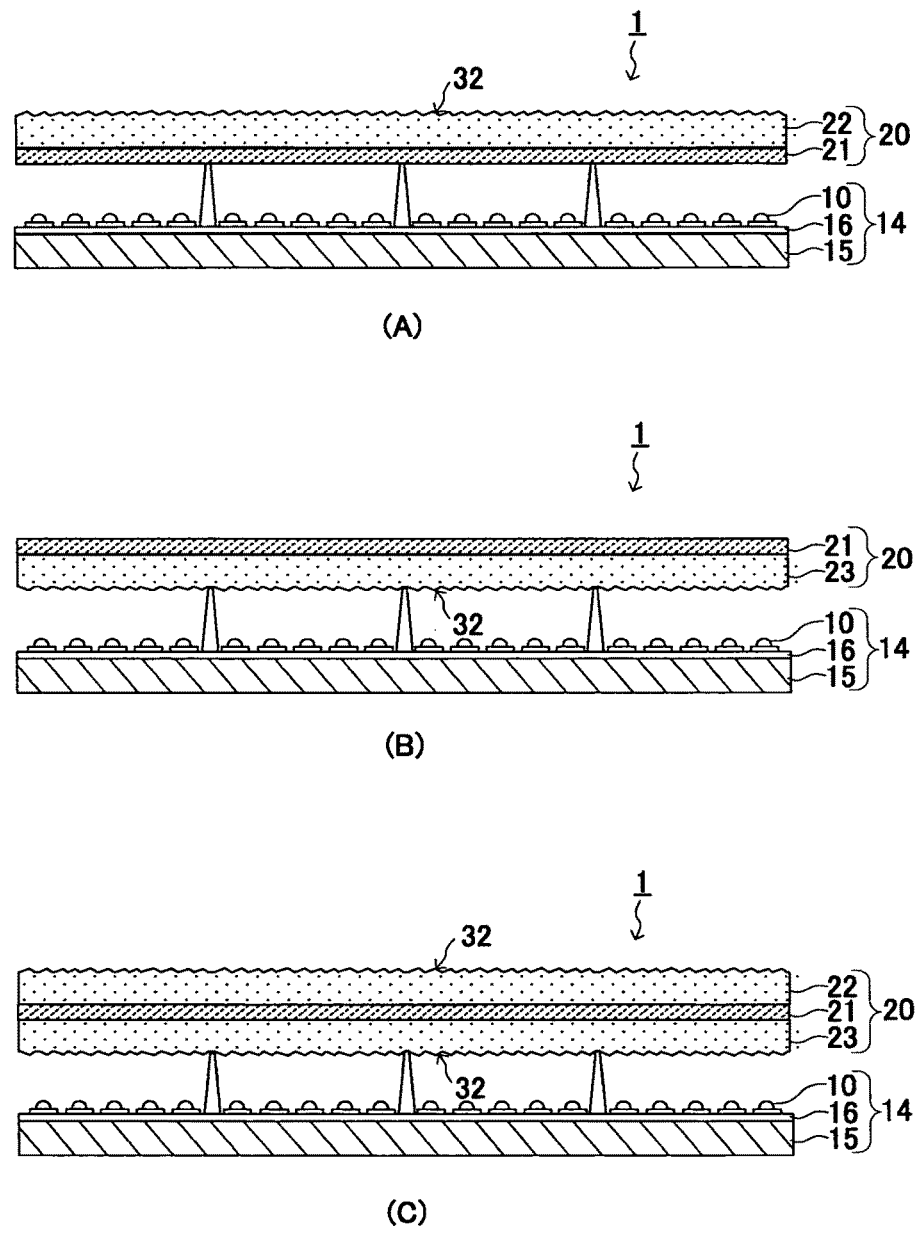
[FIG. 12] Diagrams showing Modified Example 1 of the embodiment shown in FIG. 1.
Figure 13:
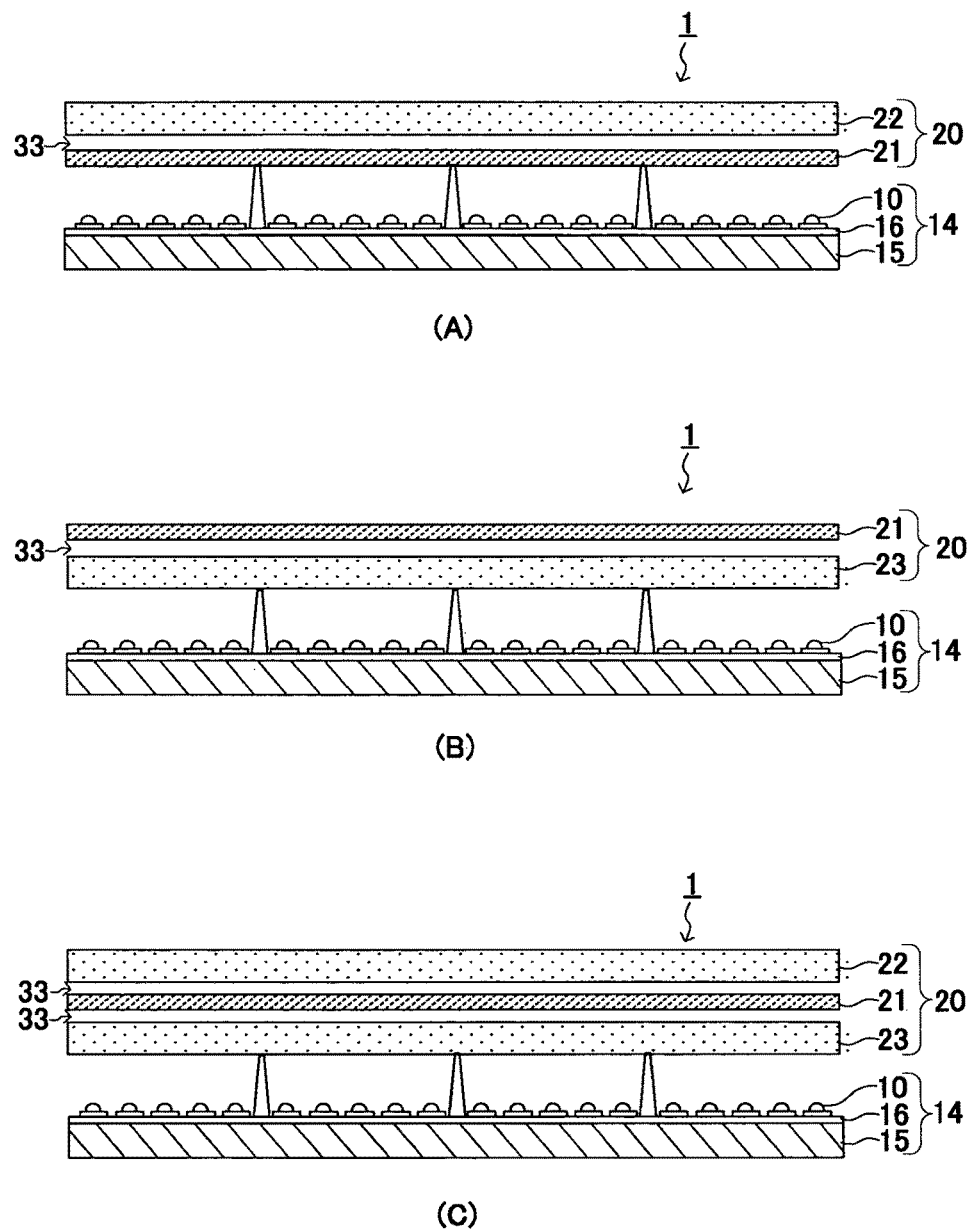
[FIG. 13] Diagrams showing Modified Example 3 of the embodiment shown in FIG. 1.
Figure 14:
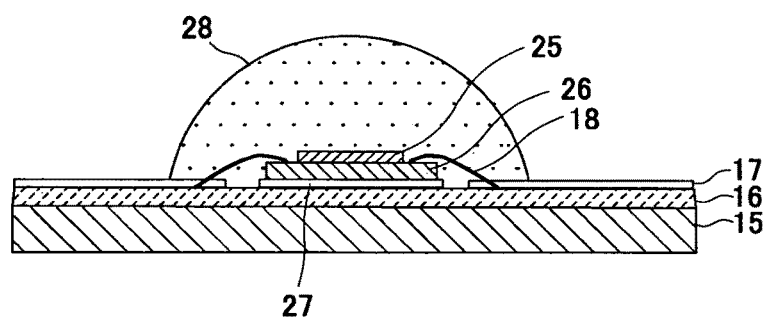
[FIG. 14] A cross-sectional diagram specifically showing a package of a blue-color light-emitting diode.
Figure 15:
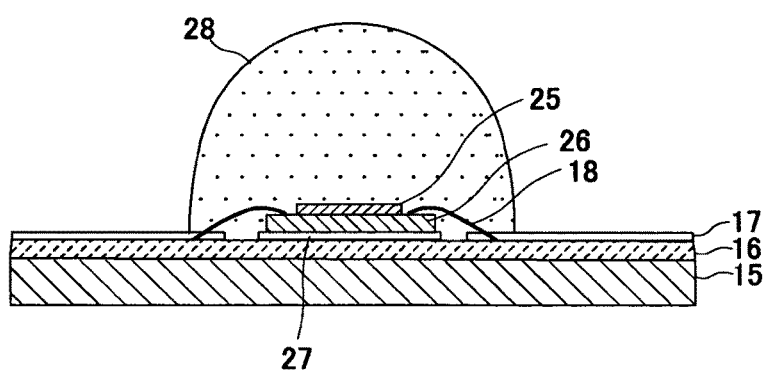
[FIG. 15] A cross-sectional diagram showing another example of a shape of a lens body of the package of the blue-color light-emitting diode.
Figure 16:
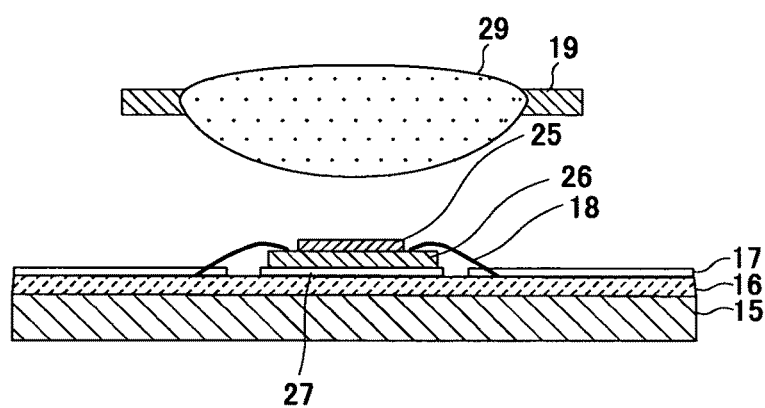
[FIG. 16] A cross-sectional diagram specifically showing another package of the blue-color light-emitting diode.
Figure 17:
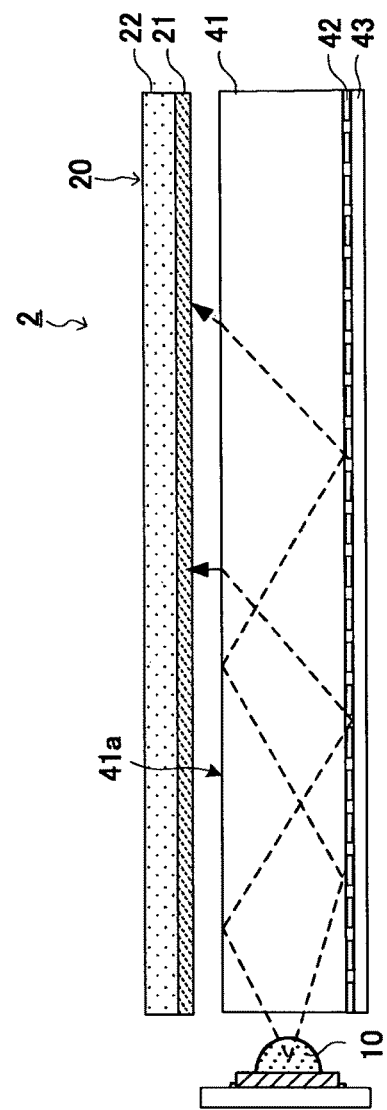
[FIG. 17] A cross-sectional diagram showing a structure of a side-emission-type backlight according to a second embodiment of the present invention.
Figure 18:
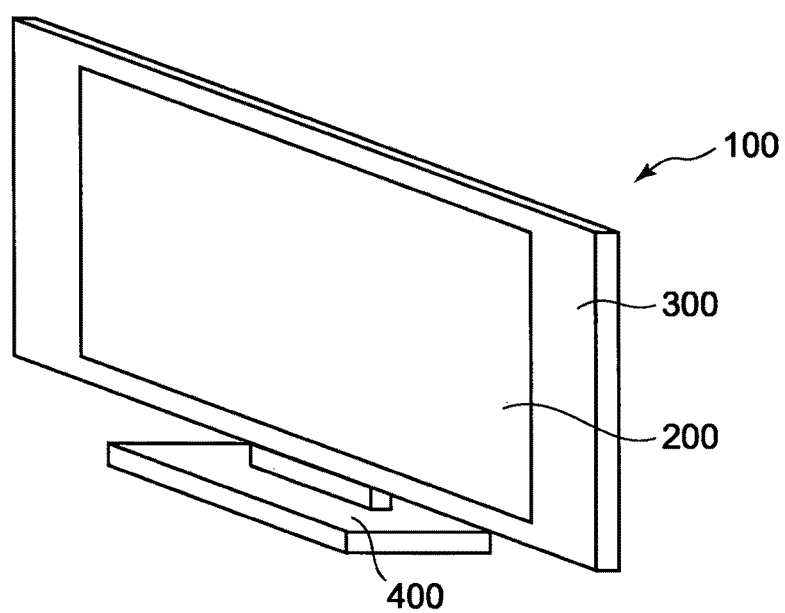
[FIG. 18] A schematic perspective view of a liquid crystal television.
Figure 19:
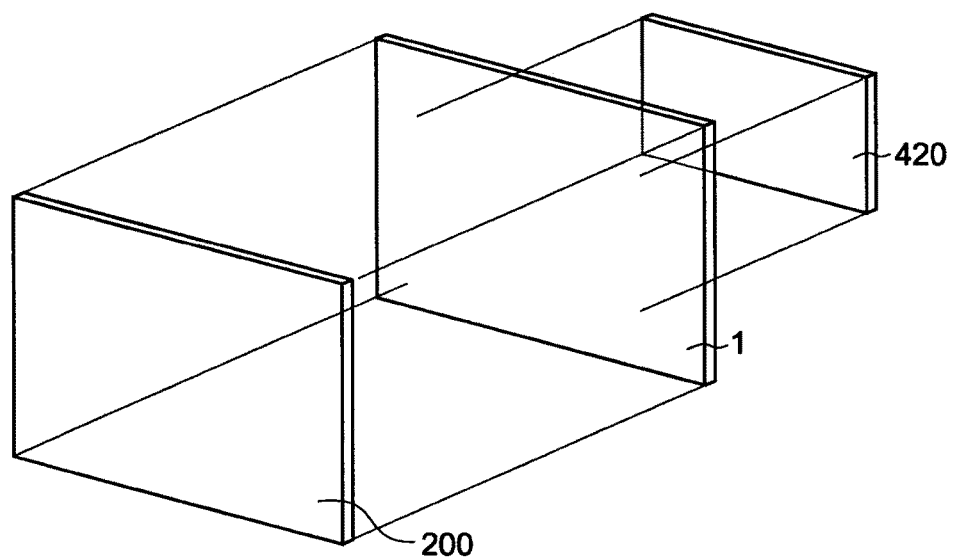
[FIG. 19] A schematic exploded perspective view of a portion held by a casing of the liquid crystal television.
Figure 20:
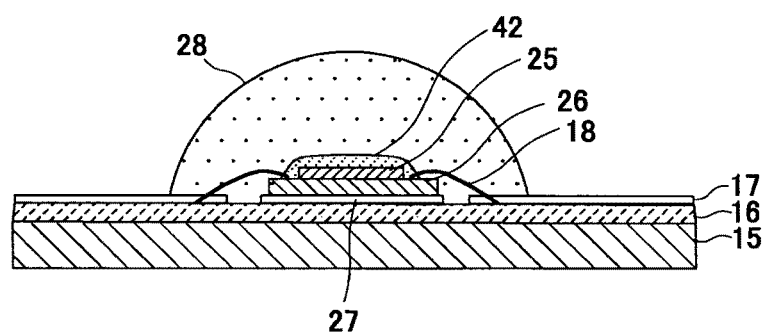
[FIG. 20] A cross-sectional diagram showing a structure of a package of a blue-color light-emitting diode for a conventional backlight.
Figure 21:
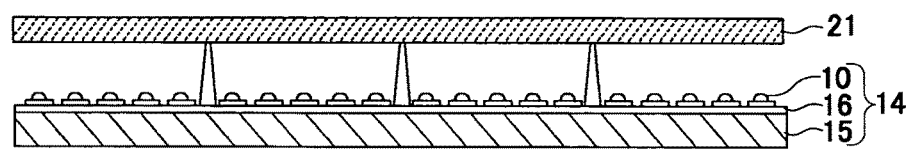
[FIG. 21] A cross-sectional diagram showing a structure of the conventional backlight.
Figure 22:
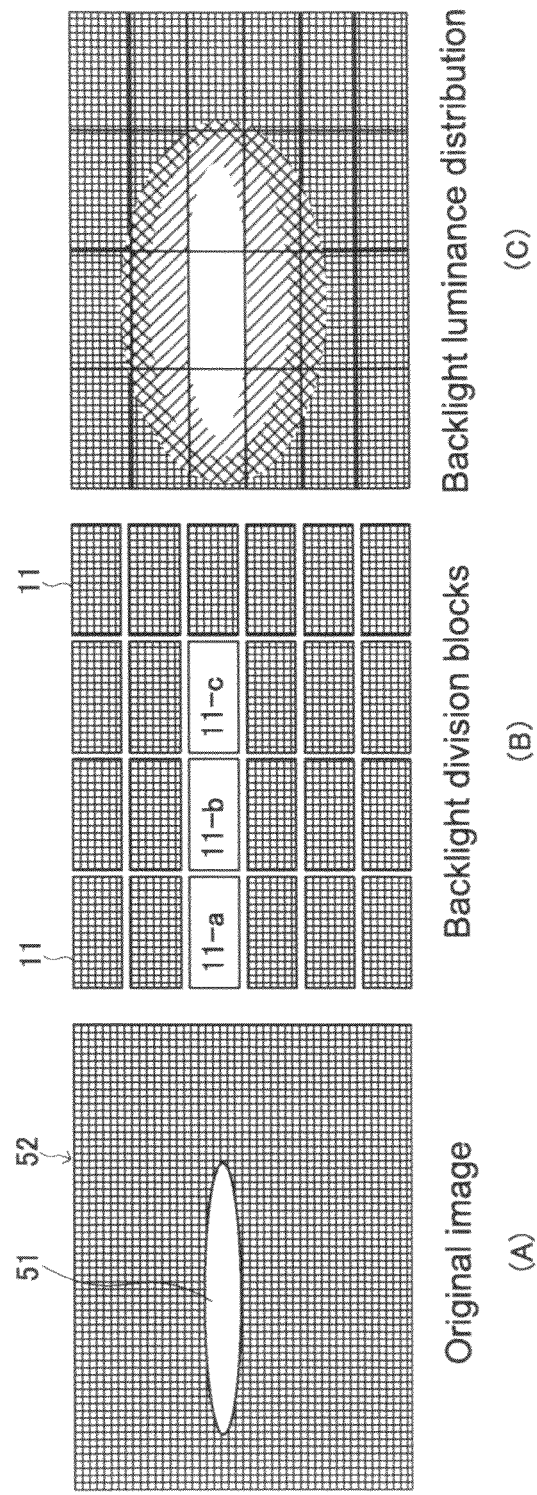
[FIG. 22] Diagrams showing an emission luminance control method in a unit of a segment of the backlight.
Figure 23:
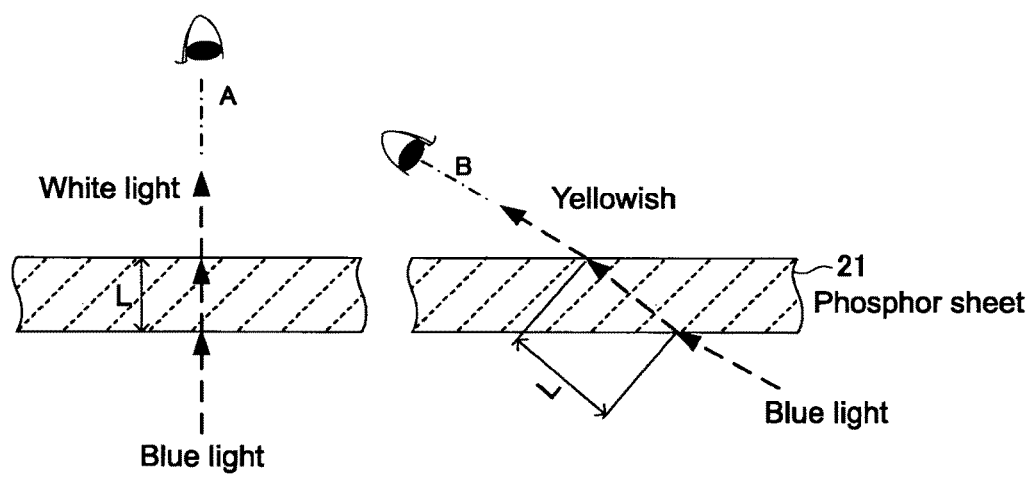
[FIG. 23] Diagrams for explaining a principle with which white-color chromaticity varies depending on an optical path.
Figure 24:
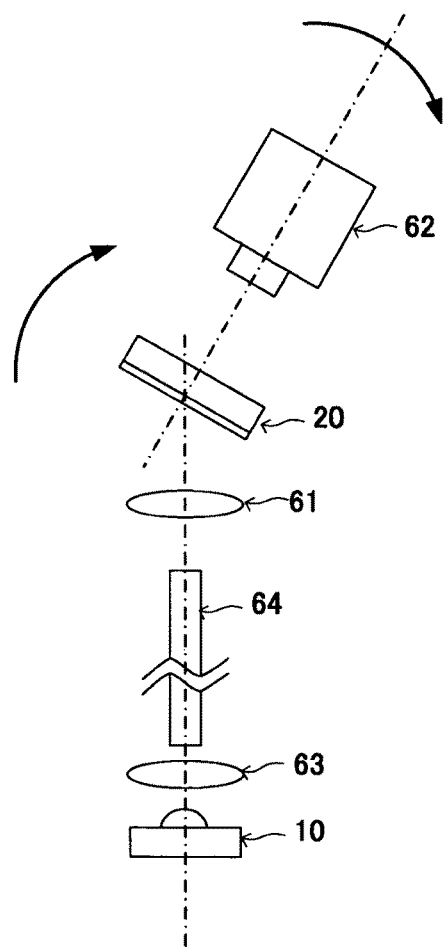
[FIG. 24] A diagram showing a measurement environment for varyingly measuring a diffusion level (total diffused transmittance) of a light diffusion means of a light-diffusion-means-attached phosphor sheet.
Figure 26:
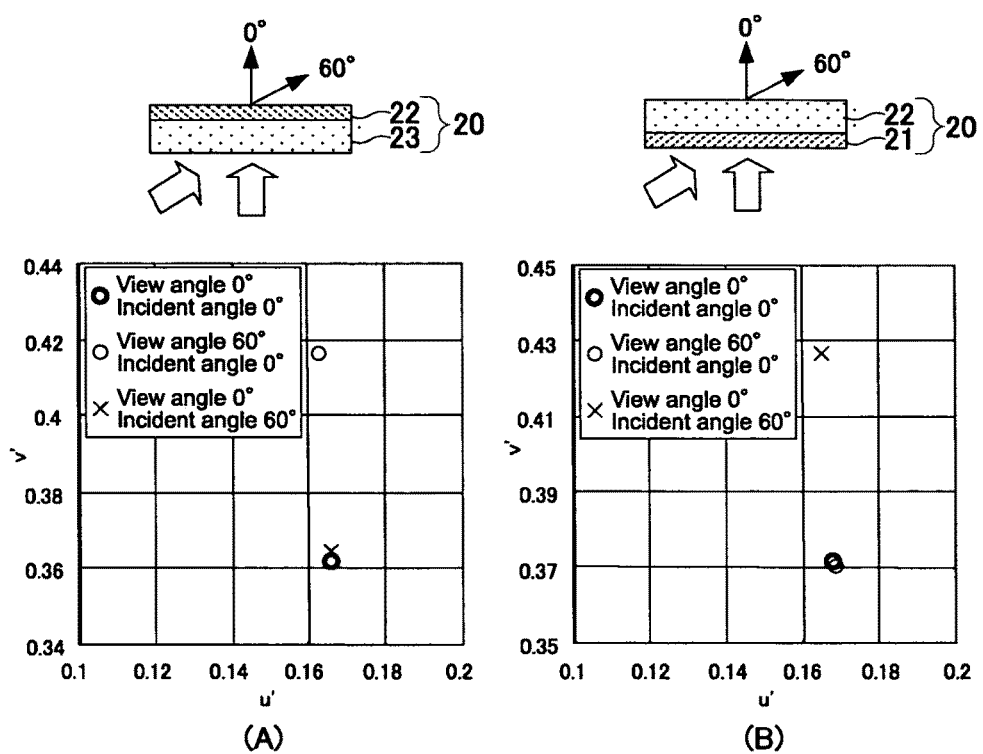
[FIG. 26] Graphs obtained by compiling measurement results of a view angle dependency of white-color chromaticity in the measurement environment of FIG. 24 using a diffusion plate having a thickness of 2 mm and a total diffused transmittance of 37%.
Figure 27:
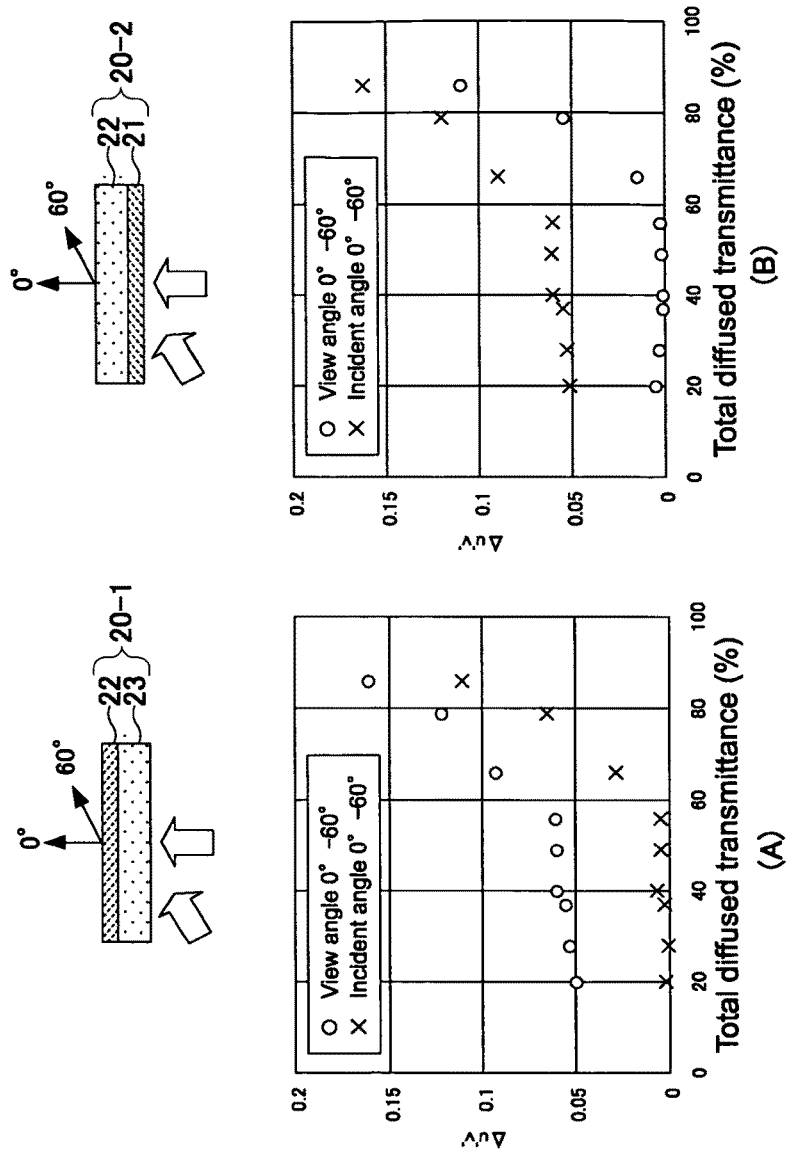
[FIG. 27] Graphs obtained by compiling measurement results of a chromaticity fluctuation Δu'v' in an incident angle range of 0° to 60° and a chromaticity fluctuation Δu'v' in a view angle range of 0° to 60° using diffusion plates having different thicknesses and total diffused transmittances.
Figure 29:
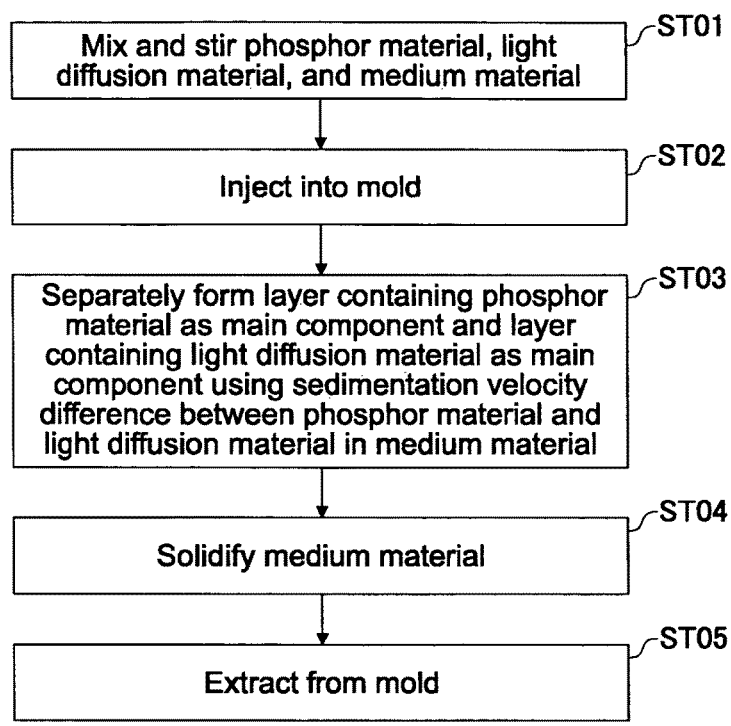
[FIG. 29] A process flow of a second production method for a light-diffusion-means-attached phosphor sheet.
Figure 30:
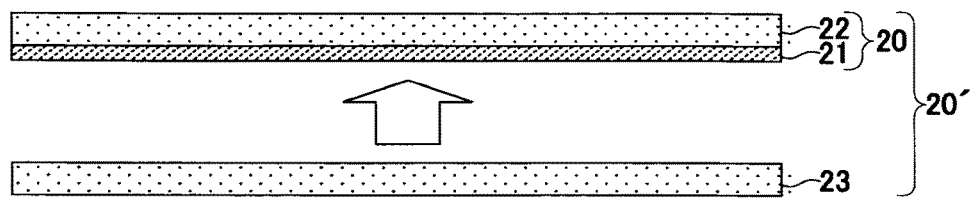
[FIG. 30] A diagram showing a method of producing a light-diffusion-means-attached phosphor sheet having a three-layer structure.
Figure 31:
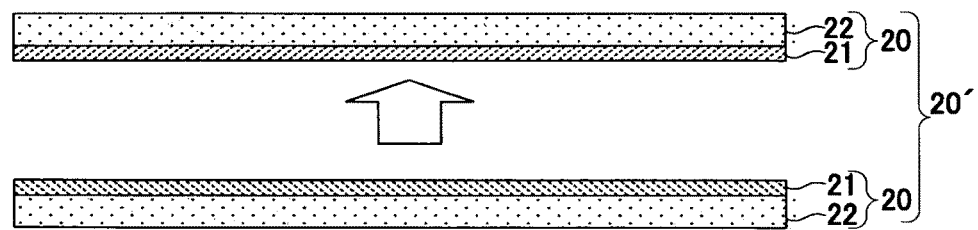
[FIG. 31] A diagram showing Modified Example 2 of the method of producing a light-diffusion-means-attached phosphor sheet having a three-layer structure.
Figure 32:
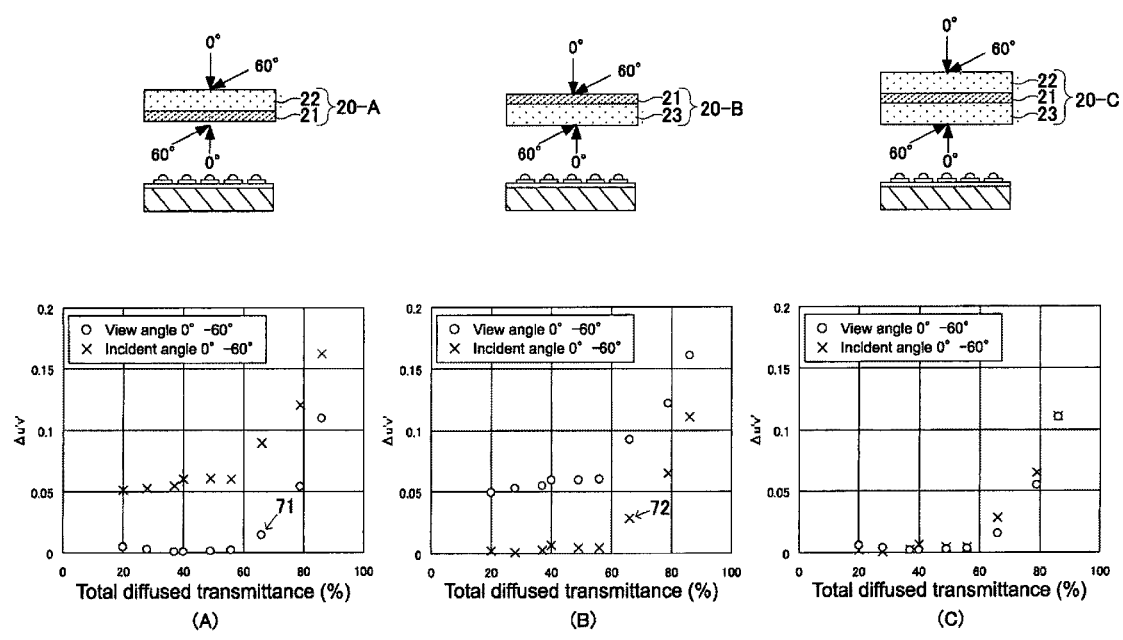
[FIG. 32] Graphs obtained by adding measurement results of a chromaticity fluctuation in a third light-diffusion-means-attached phosphor sheet to the grams shown in FIG. 27.
Figure 33:
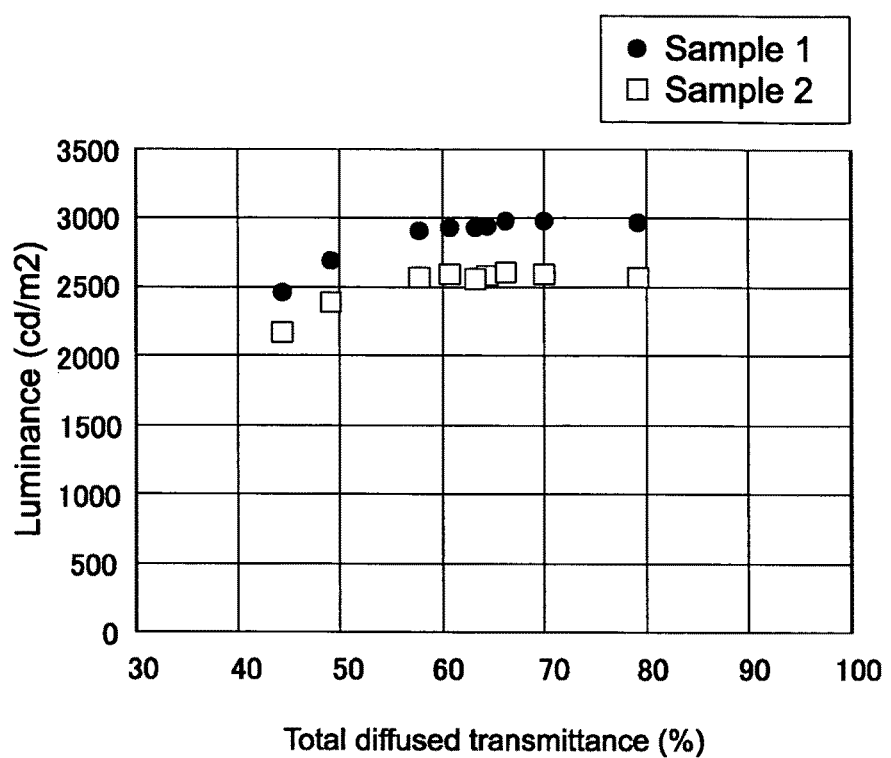
[FIG. 33] A graph showing measurement results of backlight luminance obtained by changing the total diffused transmittance of the diffusion plate provided opposite to the light-incident-side surface of the phosphor sheet.

DESCRIPTION OF REFERENCE NUMERALS 1 illumination apparatus
10 blue-color light-emitting diode
11 segment
14 light-emitting device substrate
20 light-diffusion-means-attached phosphor sheet
21 phosphor sheet
22 diffusion plate
23 diffusion plate
100 liquid crystal television
200 liquid crystal panel

The invention claimed is:

1. An illumination apparatus, comprising:
a light source formed on a substrate;
a phosphor portion comprising a phosphor to obtain white light from light produced by the light source;
at least one support structure formed between the substrate and the phosphor portion to create a gap between the phosphor portion and the substrate; and
a light diffusion means provided in correspondence with a surface of the phosphor portion.

2. The illumination apparatus according to claim 1, wherein the light diffusion means is provided to face a light-incident surface of the phosphor portion.

3. The illumination apparatus according to claim 2, wherein a total diffused transmittance of the light diffusion means is 50% or more and 66% or less.

4. The illumination apparatus according to claim 1, wherein the light diffusion means is provided to face a light-emitting surface of the phosphor portion.

5. The illumination apparatus according to claim 1, wherein the light diffusion means includes a first light diffusion means provided to face a light-incident surface of the phosphor portion and a second light diffusion means provided to face a light-emitting surface of the phosphor portion.

6. The illumination apparatus according to claim 5, wherein the first light diffusion means and the second light diffusion means are respectively provided in close contact with the light-incident surface and the light-emitting surface of the phosphor portion.

7. The illumination apparatus according to claim 5, wherein the first light diffusion means and the second light diffusion means are respectively provided apart from the light-incident surface and the light-emitting surface of the phosphor portion.

8. The illumination apparatus according to claim 5, wherein the light source comprises a plurality of light source devices that are arranged two-dimensionally, and wherein emission luminance of the plurality of light source devices can be controlled individually for each of a plurality of areas into which the surface of the phosphor portion is divided.

9. The illumination apparatus according to claim 5, wherein the light source is a blue-color light-emitting diode, and
wherein the phosphor portion includes a second phosphor to emit yellow light by being excited by blue light as excitation light.

10. The illumination apparatus according to claim 1, wherein the phosphor portion comprises a first layer that contains a phosphor material as a main component and the light diffusion means comprises a second layer that contains a light diffusion material as a main component, the first layer and the second layer being integrated by a medium material.

11. The illumination apparatus according to claim 1, wherein a total diffused transmittance of the light diffusion means is 66% or less.

12. The illumination apparatus according to claim 1, wherein the at least one support structure comprises a light guide plate.

13. A display apparatus, comprising:
a display panel; and
an illumination apparatus provided adjacent to a back surface of the display panel, the illumination apparatus including
a light source,
a phosphor portion comprising a phosphor that obtains white light produced by the light source, and
a light diffusion means provided in correspondence with a surface of the phosphor portion.

14. An illumination apparatus, comprising:
a light source;
a light guide plate that one end surface of the light guide plate is irradiated by light from the light source;
a phosphor portion constituted of a phosphor that obtains white light from light emitted by a light-emitting-side surface of the light guide plate; and
a light diffusion means provided in correspondence with a surface of the phosphor portion.

15. The illumination apparatus according to claim 14, wherein the light diffusion means is provided to face a light-incident surface of the phosphor portion.

16. The illumination apparatus according to claim 15, wherein a total diffused transmittance of the light diffusion means is 50% or more and 66% or less.

17. The illumination apparatus according to claim 14, wherein the light diffusion means is provided to face a light-emitting surface of the phosphor portion.

18. The illumination apparatus according to claim 14, wherein the light diffusion means includes a first light diffusion means provided to face a light-incident surface of the phosphor portion and a second light diffusion means provided to face a light-emitting surface of the phosphor portion.

19. The illumination apparatus according to claim 18, wherein the first light diffusion means and the second light diffusion means are respectively provided in close contact with the light-incident surface and the light-emitting surface of the phosphor portion.

20. The illumination apparatus according to claim 18, wherein the first light diffusion means and the second light diffusion means are respectively provided apart from the light-incident surface and the light-emitting surface of the phosphor portion.

21. The illumination apparatus according to claim 18, wherein the light source is a blue-color light-emitting diode, and wherein the phosphor portion includes a second phosphor to emit yellow light by being excited by blue light as excitation light.

22. The illumination apparatus according to claim 14, wherein the phosphor portion comprises a first layer that contains a phosphor material as a main component, and the light diffusion means comprises a second layer that contains a light diffusion material as a main component, the first layer and the second layer being integrated by a medium material.

23. The illumination apparatus according to claim 14, wherein a total diffused transmittance of the light diffusion means is 66% or less.

24. A display apparatus, comprising:
 a display panel; and
 an illumination apparatus provided adjacent to aback surface of the display panel, the illumination apparatus including
  a light source,
  a phosphor portion constituted of a phosphor to obtain white light produced by the light source, and
  a light diffusion means provided in correspondence with a surface of the phosphor portion.

* * * * *